United States Patent
Xing

(10) Patent No.: US 10,638,268 B2
(45) Date of Patent: Apr. 28, 2020

(54) POSITIONING METHOD AND DEVICE FOR IMPROVING POSITIONING PRECISION

(71) Applicant: Huawei Technologies Co., Ltd., Shenzhen (CN)

(72) Inventor: Zhihao Xing, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/983,991

(22) Filed: May 18, 2018

(65) Prior Publication Data

US 2018/0267134 A1    Sep. 20, 2018

Related U.S. Application Data

(63) Continuation of application No. PCT/CN2017/079787, filed on Apr. 7, 2017.

(30) Foreign Application Priority Data

Aug. 8, 2016   (CN) .......................... 2016 1 0648629

(51) Int. Cl.
*H04W 24/00*     (2009.01)
*H04W 4/029*    (2018.01)
(Continued)

(52) U.S. Cl.
CPC ........... *H04W 4/029* (2018.02); *G01S 5/0215* (2013.01); *G01S 5/0242* (2013.01); *G01S 5/0289* (2013.01);
(Continued)

(58) Field of Classification Search
CPC .... G01S 5/0289; G01S 5/0242; G01S 5/0215; G01S 5/14; G01S 5/0284; G01S 13/767;
(Continued)

(56) References Cited

U.S. PATENT DOCUMENTS 8,472,968 B1 *  6/2013  Kim .................... H04W 52/244
                                                             370/232
8,818,390 B2 *  8/2014  Honjo .................. G01S 5/0205
                                                              455/450
(Continued)

FOREIGN PATENT DOCUMENTS

CN         101542310 A        9/2009
CN         103260237 A        8/2013
(Continued)

OTHER PUBLICATIONS

He, J., et al., "A Testbed for Evaluation of the Effects of Multipath on Performance of TOA-based Indoor Geolocation," IEEE Transactions on Instrumentation and Measurement, vol. 62, No. 8, Aug. 2013, pp. 2237-2247.

(Continued)

*Primary Examiner* — Khoi H Tran
*Assistant Examiner* — B M M Hannan
(74) *Attorney, Agent, or Firm* — Conley Rose, P.C.

(57) ABSTRACT

A positioning system, method, and apparatus relate to the communications field in order to improve positioning precision. The system includes a preset anchor set, a positioning server, and at least one positioning terminal. A distance between the at least one positioning terminal and a to-be-positioned terminal falls within a preset range. The at least one positioning terminal is configured to receive an instruction message, and execute a positioning packet interaction procedure with at least one anchor in the preset anchor set according to the instruction message. The interaction procedure enables the positioning terminal or the anchor executing the interaction procedure to obtain positioning support information. The positioning server is configured to receive the positioning support information, and position the (Continued)

to-be-positioned terminal according to the positioning support information.

20 Claims, 13 Drawing Sheets

(51) Int. Cl.
| | | |
|---|---|---|
| *H04W 4/02* | (2018.01) | |
| *G01S 5/02* | (2010.01) | |
| *G01S 5/14* | (2006.01) | |
| *H04W 64/00* | (2009.01) | |

(52) U.S. Cl.
CPC ............... *G01S 5/14* (2013.01); *H04W 4/02* (2013.01); *H04W 64/006* (2013.01)

(58) Field of Classification Search
CPC ........ G01S 5/0036; G01S 5/0072; G01S 5/02; G01S 5/10; G01S 5/12; H04W 64/006; H04W 4/023; H04W 4/025; H04W 4/50; H04W 4/70; H04W 64/00
USPC .............................................. 455/456.1–457
See application file for complete search history.

(56) References Cited

U.S. PATENT DOCUMENTS

| | | | | |
|---|---|---|---|---|
| 2004/0235499 | A1* | 11/2004 | Tanaka | G01S 5/0221 |
| | | | | 455/456.5 |
| 2005/0266860 | A1 | 12/2005 | Tamaki et al. | |
| 2008/0268873 | A1* | 10/2008 | Wymeersch | G01S 5/0289 |
| | | | | 455/456.6 |
| 2010/0020776 | A1* | 1/2010 | Youssef | H04W 64/00 |
| | | | | 370/338 |
| 2010/0150117 | A1* | 6/2010 | Aweya | G01S 5/14 |
| | | | | 370/338 |
| 2010/0267396 | A1* | 10/2010 | Honjo | G01S 5/0205 |
| | | | | 455/452.2 |
| 2011/0098057 | A1* | 4/2011 | Edge | G01S 5/0018 |
| | | | | 455/456.1 |
| 2012/0071170 | A1 | 3/2012 | Cho et al. | |
| 2012/0182180 | A1* | 7/2012 | Wolf | G01S 5/021 |
| | | | | 342/357.29 |
| 2013/0267242 | A1* | 10/2013 | Curticapean | H04W 64/003 |
| | | | | 455/456.1 |
| 2015/0011240 | A1* | 1/2015 | Xiao | G01S 5/10 |
| | | | | 455/456.1 |
| 2015/0271764 | A1* | 9/2015 | Agrawal | H04W 52/246 |
| | | | | 455/522 |
| 2016/0205504 | A1 | 7/2016 | Chen et al. | |
| 2016/0349353 | A1* | 12/2016 | Wang | H04W 4/02 |
| 2017/0171701 | A1 | 6/2017 | Zhou | |
| 2017/0223657 | A1* | 8/2017 | Sen | G01S 5/14 |
| 2017/0367067 | A1* | 12/2017 | Hwang | H04W 64/006 |
| 2018/0139578 | A1 | 5/2018 | Xiao et al. | |

FOREIGN PATENT DOCUMENTS

| | | | | |
|---|---|---|---|---|
| CN | 104519566 A | | 4/2015 | |
| CN | 105282841 A | | 1/2016 | |
| KR | 20170141471 A | * | 12/2017 | .......... H04W 64/006 |
| WO | 2012095922 A1 | | 7/2012 | |

OTHER PUBLICATIONS

Foreign Communication From a Counterpart Application, PCT Application No. PCT/CN2017/079787, English Translation of International Search Report dated May 27, 2017, 2 pages.

Foreign Communication From a Counterpart Application, European Application No. 17838359.2, Extended European Search Report dated Nov. 19, 2018, 12 pages.

Foreign Communication From a Counterpart Application, Chinese Application No. 201610648629.6, Chinese Office Action dated Jul. 18, 2019, 8 pages.

* cited by examiner

POSITIONING METHOD AND DEVICE FOR IMPROVING POSITIONING PRECISION

CROSS-REFERENCE TO RELATED APPLICATIONS

This application is a continuation of International Patent Application No. PCT/CN2017/079787 filed on Apr. 7, 2017, which claims priority to Chinese Patent Application No. 201610648629.6 filed on Aug. 8, 2016. The disclosures of the aforementioned applications are hereby incorporated by reference in their entireties.

TECHNICAL FIELD

The present disclosure relates to the communications field, and in particular, to a positioning system, method, and apparatus.

BACKGROUND

With rapid development of wireless communications technologies, mobile Internet technologies, and intelligent mobile terminal technologies, there is an increasing demand for wireless positioning services, and wireless positioning technologies are attracting increasing attention.

A method for positioning a to-be-positioned terminal using a wireless positioning technology may be summarized as follows. A to-be-positioned terminal executes a positioning packet interaction procedure with each anchor (that is, a node having a known position) to obtain positioning support information, and then a position of the to-be-positioned terminal is determined according to the positioning support information and a positioning algorithm. The positioning support information is information related to the positioning algorithm and used to implement positioning. For example, if the positioning algorithm is a time of arrival (TOA) the positioning support information may be a travel time or a travel distance of a signal between the to-be-positioned terminal and an anchor. If the positioning algorithm is an angle of arrival (AOA), the positioning support information may be an AOA of a signal from the to-be-positioned terminal to an anchor, an AOA of a signal from an anchor to the to-be-positioned terminal, or the like.

In the foregoing positioning process, if there is no obstacle between the to-be-positioned terminal and an anchor, a communication channel between the anchor and the to-be-positioned terminal is a line of sight (LOS) channel. If there is an obstacle between the to-be-positioned terminal and an anchor, a communication channel between the anchor and the to-be-positioned terminal is an non LOS (NLOS) channel. A wireless signal between the anchor and the to-be-positioned terminal may be severely attenuated and reflected in a transmission process. Consequently, positioning support information obtained in a process in which the to-be-positioned terminal executes a positioning packet interaction procedure with the anchor is inaccurate, and a finally obtained positioning result is inaccurate. Precision of positioning support information obtained based on an NLOS channel is lower than that of positioning support information obtained based on a LOS channel. Because it is quite common that during actual implementation, there is an obstacle between a to-be-positioned terminal and an anchor, a finally obtained positioning result is inaccurate.

In addition, capabilities of different to-be-positioned terminals to communicate with an anchor are different. In some scenarios in which a network environment is not quite favorable, a to-be-positioned terminal having a relatively favorable capability to communicate with an anchor can obtain a relatively accurate positioning result while a to-be-positioned terminal having a relatively poor capability to communicate with an anchor obtains an inaccurate positioning result.

SUMMARY

Embodiments of the present disclosure provide a positioning system, method, and apparatus in order to improve positioning precision.

To achieve the foregoing objective, the embodiments of the present disclosure use the following technical solutions.

According to a first aspect, a positioning system is provided, where the system is used to position a to-be-positioned terminal, and may include a preset anchor set, a positioning server, and at least one positioning terminal, and a distance between the at least one positioning terminal and the to-be-positioned terminal falls within a preset range. The at least one positioning terminal is configured to receive an instruction message, and execute a positioning packet interaction procedure with at least one anchor in the preset anchor set according to the instruction message. The interaction procedure is used to enable the positioning terminal or the anchor that executes the interaction procedure to obtain positioning support information. The positioning server is configured to receive the positioning support information, and position the to-be-positioned terminal according to the positioning support information.

A positioning terminal may exchange information with different anchors. When the at least one positioning terminal includes multiple positioning terminals, different positioning terminals may execute positioning packet interaction procedures with a same anchor, or may execute positioning packet interaction procedures with different anchors. Generally, in a process in which a positioning terminal executes a positioning packet interaction procedure with an anchor, the positioning terminal or the anchor obtains one piece of positioning support information. The positioning server may position the to-be-positioned terminal using some or all positioning support information obtained in the positioning packet interaction procedure between the at least one positioning terminal and the at least one anchor in the preset anchor set.

For example, if the positioning terminal obtains the positioning support information, the positioning terminal may directly send the positioning support information to the server, or may first send the positioning support information to the anchor, and then the anchor sends the positioning support information to the server. Correspondingly, if the anchor obtains the positioning support information, the anchor may directly send the positioning support information to the server, or may first send the positioning support information to the positioning terminal, and then the positioning terminal sends the positioning support information to the server.

In the positioning system provided in this embodiment of the present disclosure, the to-be-positioned terminal is positioned using positioning packet information obtained after the at least one positioning terminal whose distance from the to-be-positioned terminal falls within the preset range executes the positioning packet interaction procedure with the at least one anchor in the preset anchor set. In some cases, a position of the positioning terminal whose distance from the to-be-positioned terminal falls within the preset range is usually different from a position of the to-bepositioned terminal. Therefore, although an obstacle blocks communication between the to-be-positioned terminal and an anchor, the obstacle cannot block communication between a positioning terminal in another position and the anchor. In this way, a channel between each anchor and the at least one positioning terminal may be a LOS channel in order to improve quality of the obtained positioning support information. In some other cases, different terminals (including a positioning terminal and a to-be-positioned terminal) provide different communication capabilities. Therefore, in the system provided in this embodiment of the present disclosure, the to-be-positioned terminal may be positioned using positioning packet information obtained after the at least one positioning terminal executes the positioning packet interaction procedure with the at least one anchor in the preset anchor set in order to avoid a problem that quality of the positioning support information is relatively poor due to an insufficient communication capability of a single terminal (a to-be-positioned terminal herein), and improve the quality of the positioning support information. The distance between the positioning terminal and the to-be-positioned terminal falls within the preset range, and the positioning terminal is close to the to-be-positioned terminal. Therefore, the positioning server may consider the positioning support information of the positioning terminal as positioning support information of the to-be-positioned terminal to position the to-be-positioned terminal in order to avoid a case in which quality of positioning support information is not favorable when positioning is performed only according to positioning support information of a to-be-positioned terminal, and improve precision of a positioning result.

Optionally, the system may further include a control device configured to determine a positioning request for positioning the to-be-positioned terminal, and send the instruction message to the at least one positioning terminal. In the optional implementation, the control device has a management function that is further a function of sending the instruction message to the at least one positioning terminal. In this way, when the at least one positioning terminal includes multiple positioning terminals, management performance of the system can be improved. A position relationship between the control device and the to-be-positioned terminal is not limited in this embodiment of the present disclosure. In addition, the control device may be implemented by adding a management function module to the positioning terminal or the to-be-positioned terminal, or may be implemented by adding a management function module to a non-positioning terminal or a non-to-be-positioned terminal, or may be a dedicated management device or the like.

Optionally, the control device may be further configured to execute a positioning packet interaction procedure with the at least one anchor in the preset anchor set. In the optional implementation, the control device further has a function of the positioning terminal. That is, it may be understood that the control device in the optional implementation is implemented by adding a management function module to the positioning terminal. Optionally, a distance between the control device and the to-be-positioned terminal falls within the preset range. In this way, the to-be-positioned terminal is positioned using the positioning support information obtained by the control device whose distance from the to-be-positioned terminal falls within the preset range and the at least one positioning terminal in order to further improve precision of a positioning result.

Optionally, the to-be-positioned terminal may be further configured to execute a positioning packet interaction procedure with the at least one anchor in the preset anchor set. In this way, the to-be-positioned terminal is positioned using positioning packet information that is obtained after the to-be-positioned terminal, the control device whose distance from the to-be-positioned terminal falls within the preset range, and the at least one positioning terminal separately execute the positioning packet interaction procedure with the at least one anchor in the preset anchor set in order to further improve precision of a positioning result.

The to-be-positioned terminal may start to execute the positioning packet interaction procedure with the at least one anchor in the preset anchor set according to a trigger mechanism provided in other approaches, or may start to execute the positioning packet interaction procedure with the at least one anchor in the preset anchor set after receiving the instruction message sent by the control device.

Optionally, a device that obtains positioning support information may be configured to send the obtained positioning support information to the control device. In this case, the control device may be further configured to send the positioning support information to the positioning server. In the optional implementation, the device that obtains the positioning support information may be one or more of the anchor, the positioning terminal, or the to-be-positioned terminal. During actual implementation, in an implementation in which the control device executes the positioning packet interaction procedure with the at least one anchor in the preset anchor set, the control device may be used as the device that obtains the positioning support information. In the optional implementation, the control device manages the device that obtains the positioning support information in order to send the positioning support information to the positioning server, and improve management performance of the system.

Optionally, the device that obtains the positioning support information may be further configured to obtain at least one piece of the following information including identifiers of two interaction parties in the interaction procedure or a quality factor of the positioning support information. The quality factor of the positioning support information is used to represent quality of the positioning support information. In this case, the control device may be further configured to send the at least one piece of information to the positioning server. For functions of all the information, refer to the description of embodiments. Details are not described herein.

Further, this embodiment of the present disclosure further provides a technical solution for obtaining the quality factor of the positioning support information. Optionally, the device that obtains the positioning support information may be further configured to obtain the quality factor of the positioning support information according to at least one piece of the following information including whether a transmission channel of a positioning packet is a LOS channel, a signal-to-noise ratio of a positioning packet, a wireless signal bandwidth used during positioning packet transmission, an analog to digital converter (ADC) sampling rate that is of a receiver and used during positioning packet transmission, or stability of the positioning support information obtained for multiple times within a preset time period.

Optionally, the positioning server may be further configured to receive the quality factor of the positioning support information from the device that obtains the positioning support information. Further, the positioning server may directly receive the quality factor that is of the positioning support information and that is sent by the device that obtains the positioning support information, or may receive, from the device that obtains the positioning support information, the quality factor that is of the positioning support information and that is sent by the control device. In this case, the positioning server may be configured to position the to-be-positioned terminal according to positioning support information whose quality factor meets a preset condition. In this way, the to-be-positioned terminal is positioned according to positioning support information whose quality factor is relatively high (that is, whose quality is relatively favorable) in order to improve positioning precision.

Optionally, the positioning server may be further configured to position the to-be-positioned terminal according to positioning support information received within the preset time period, or position the to-be-positioned terminal according to a preset amount of positioning support information with a high receiving time priority. An earlier receiving time leads to a higher receiving time priority. In this way, a positioning speed can be improved in order to shorten a time consumed in a positioning process.

According to a second aspect, a positioning method is provided, where the method is used to position a to-be-positioned terminal, and may include determining, by a control device, a positioning request for positioning the to-be-positioned terminal, and sending an instruction message to at least one positioning terminal according to the positioning request, where a distance between the positioning terminal and the to-be-positioned terminal falls within a preset range, the instruction message is used to instruct the positioning terminal to execute a positioning packet interaction procedure with at least one anchor in a preset anchor set, the interaction procedure is used to enable the positioning terminal or the anchor that executes the interaction procedure to obtain positioning support information, and the positioning support information is used to enable a positioning server to position the to-be-positioned terminal.

According to a third aspect, a control device is provided, where the control device is configured to position a to-be-positioned terminal, and may include a determining unit and a sending unit. The determining unit is configured to determine a positioning request for positioning the to-be-positioned terminal. The sending unit is configured to send an instruction message to at least one positioning terminal according to the positioning request. A distance between the positioning terminal and the to-be-positioned terminal falls within a preset range, the instruction message is used to instruct the positioning terminal to execute a positioning packet interaction procedure with at least one anchor in a preset anchor set, the interaction procedure is used to enable the positioning terminal or the anchor that executes the interaction procedure to obtain positioning support information, and the positioning support information is used to enable a positioning server to position the to-be-positioned terminal.

For beneficial effects that can be achieved by the positioning method provided in the second aspect and the control device provided in the third aspect, refer to the positioning system provided in the first aspect. Details are not described herein again.

Optionally, based on the second aspect, a distance between the control device and the to-be-positioned terminal falls within the preset range, and after the determining, by a control device, a positioning request for positioning the to-be-positioned terminal, the method may further include executing, by the control device, a positioning packet interaction procedure between the control device and the at least one anchor in the preset anchor set.

Correspondingly, based on the third aspect, a distance between the control device and the to-be-positioned terminal falls within the preset range, and the control device may further include an interaction unit configured to execute a positioning packet interaction procedure with the at least one anchor in the preset anchor set.

Optionally, based on the second aspect or any optional implementation of the second aspect, the method may further include receiving, by the control device, positioning support information sent by a device that obtains the positioning support information, and sending the positioning support information to the positioning server.

Correspondingly, based on the third aspect or any optional implementation of the third aspect, the positioning terminal may further include a receiving unit configured to receive positioning support information sent by a device that obtains the positioning support information. In this case, the sending unit may be further configured to send the positioning support information to the positioning server.

Optionally, based on the second aspect or any optional implementation of the second aspect, the method may further include obtaining, by the control device, at least one piece of the following information identifiers of two interaction parties in the interaction procedure or a quality factor of the positioning support information, where the quality factor of the positioning support information is used to represent quality of the positioning support information, and sending, by the control device, the at least one piece of information to the positioning server, where the at least one piece of information is used to enable the positioning server to position the to-be-positioned terminal.

Correspondingly, based on the third aspect or any optional implementation of the third aspect, the control device may further include an obtaining unit configured to obtain at least one piece of the following information including identifiers of two interaction parties in the interaction procedure or a quality factor of the positioning support information, where the quality factor of the positioning support information is used to represent quality of the positioning support information. In this case, the sending unit may be further configured to send the at least one piece of information to the positioning server, where the at least one piece of information is used to enable the positioning server to position the to-be-positioned terminal.

Optionally, based on the second aspect or any optional implementation of the second aspect, the method may further include receiving, by the control device, at least one piece of the following information sent by the device that obtains the positioning support information the identifiers of two interaction parties in the interaction procedure or the quality factor of the positioning support information, and sending the at least one piece of information to the positioning server. The quality factor of the positioning support information is used to represent the quality of the positioning support information, and the at least one piece of information is used to enable the positioning server to position the to-be-positioned terminal.

Correspondingly, based on the third aspect or any optional implementation of the third aspect, the receiving unit may be further configured to receive at least one piece of the following information sent by the device that obtains the positioning support information including the identifiers of two interaction parties in the interaction procedure or the quality factor of the positioning support information, and the sending unit may be further configured to send the at least one piece of information to the positioning server. The quality factor of the positioning support information is used to represent the quality of the positioning support information, and the at least one piece of information is used to enable the positioning server to position the to-be-positioned terminal.

Optionally, based on the second aspect, the method may further include obtaining, by the control device, the positioning support information in the positioning packet interaction procedure between the control device and the at least one anchor in the preset anchor set. Optionally, the method may further include obtaining, by the control device, at least one piece of the following information including identifiers of two interaction parties in the interaction procedure or a quality factor of the positioning support information, where the quality factor of the positioning support information is used to represent quality of the positioning support information. In the optional implementation, when the control device is used as the device that obtains the positioning support information, the positioning terminal may also obtain the at least one piece of information.

For example, that the control device obtains the quality factor of the positioning support information may include obtaining, by the control device, the quality factor of the positioning support information according to at least one piece of the following information including whether a transmission channel of a positioning packet is a LOS channel, a signal-to-noise ratio of a positioning packet, a wireless signal bandwidth used during positioning packet transmission, an ADC sampling rate that is of a receiver and used during positioning packet transmission, or stability of the positioning support information obtained for multiple times within a preset time period.

Optionally, based on the third aspect, the positioning terminal may further include an obtaining unit configured to obtain the positioning support information in the positioning packet interaction procedure between the interaction unit and the at least one anchor in the preset anchor set. Optionally, the obtaining unit may be further configured to obtain at least one piece of the following information including identifiers of two interaction parties in the interaction procedure or a quality factor of the positioning support information. The quality factor of the positioning support information is used to represent quality of the positioning support information. In the optional implementation, when the control device is used as the device that obtains the positioning support information, the positioning terminal may also obtain the at least one piece of information.

For example, the obtaining unit may be further configured to obtain the quality factor of the positioning support information according to at least one piece of the following information including whether a transmission channel of a positioning packet is a LOS channel, a signal-to-noise ratio of a positioning packet, a wireless signal bandwidth used during positioning packet transmission, an ADC sampling rate that is of a receiver and used during positioning packet transmission, or stability of the positioning support information obtained for multiple times within a preset time period.

According to a fourth aspect, a positioning method is provided, where the method is used to position a to-be-positioned terminal, and may include receiving, by a positioning terminal, an instruction message, and executing a positioning packet interaction procedure with at least one anchor in a preset anchor set according to the instruction message. A distance between the positioning terminal and the to-be-positioned terminal falls within a preset range, the interaction procedure is used to enable the positioning terminal or the anchor that executes the interaction procedure to obtain positioning support information, and the positioning support information is used to enable a positioning server to position the to-be-positioned terminal.

According to a fifth aspect, a positioning terminal is provided, where the positioning terminal is configured to position a to-be-positioned terminal, a distance between the positioning terminal and the to-be-positioned terminal falls within a preset range, and the positioning terminal may include a receiving unit and an interaction unit. The receiving unit is configured to receive an instruction message. The interaction unit is configured to execute a positioning packet interaction procedure with at least one anchor in a preset anchor set according to the instruction message. The interaction procedure is used to enable the positioning terminal or the anchor that executes the interaction procedure to obtain positioning support information, and the positioning support information is used to enable a positioning server to position the to-be-positioned terminal. During specific implementation, the positioning server may position the to-be-positioned terminal using multiple pieces of positioning support information obtained by the positioning terminal provided in the fifth aspect.

For beneficial effects that can be achieved by the positioning method provided in the fourth aspect and the positioning terminal provided in the fifth aspect, refer to the positioning system provided in the first aspect. Details are not described herein again.

Optionally, based on the fourth aspect, the receiving, by a positioning terminal, an instruction message may include receiving, by the positioning terminal, an instruction message sent by a control device. In addition, the positioning terminal may receive an instruction message sent by another positioning terminal or the positioning server.

Correspondingly, based on the fifth aspect, the receiving unit may be further configured to receive an instruction message sent by a control device. Optionally, the receiving unit may be further configured to receive an instruction message sent by another positioning terminal or the positioning server.

Optionally, based on the fourth aspect or any optional implementation of the fourth aspect, the method may further include obtaining, by the positioning terminal, the positioning support information in a process in which the positioning terminal executes the positioning packet interaction procedure with the at least one anchor in the preset anchor set, and sending the obtained positioning support information to the positioning server using the control device. Further, optionally, the method may further include obtaining, by the positioning terminal, at least one piece of the following information identifiers of two interaction parties in the interaction procedure or a quality factor of the positioning support information, where the quality factor of the positioning support information is used to represent quality of the positioning support information, and sending, by the positioning terminal, the at least one piece of information to the positioning server using the control device, where the at least one piece of information is used to enable the positioning server to position the to-be-positioned terminal.

Correspondingly, based on the fifth aspect, the positioning terminal may further include an obtaining unit and a sending unit. The obtaining unit is configured to obtain the positioning support information in a process in which the interaction unit executes the positioning packet interaction procedure with the at least one anchor in the preset anchor set. The sending unit is configured to send, to the positioning server using the control device, the positioning support information obtained by the obtaining unit. Further, optionally, the obtaining unit may be further configured to obtain at least one piece of the following information identifiers of two interaction parties in the interaction procedure or a quality factor of the positioning support information. The quality factor of the positioning support information is used to represent quality of the positioning support information. The sending unit may be further configured to send the at least one piece of information to the positioning server using the control device. The at least one piece of information is used to enable the positioning server to position the to-be-positioned terminal.

According to a sixth aspect, a positioning method is provided, where the method is used to position a to-be-positioned terminal, and may include receiving, by a positioning server, at least one piece of positioning support information, where the positioning support information is positioning support information obtained in a process in which at least one positioning terminal executes a positioning packet interaction procedure with at least one anchor in a preset anchor set, and a distance between the positioning terminal and the to-be-positioned terminal falls within a preset range, and positioning, by the positioning server, the to-be-positioned terminal according to the at least one piece of positioning support information.

According to a seventh aspect, a positioning server is provided, where the positioning server is configured to position a to-be-positioned terminal, and may include a receiving unit and a positioning unit. The receiving unit is configured to receive at least one piece of positioning support information. The positioning support information is positioning support information obtained in a process in which at least one positioning terminal executes a positioning packet interaction procedure with at least one anchor in a preset anchor set, and a distance between the positioning terminal and the to-be-positioned terminal falls within a preset range. The positioning unit is configured to position the to-be-positioned terminal according to the at least one piece of positioning support information.

For beneficial effects that can be achieved by the positioning method provided in the sixth aspect and the positioning server provided in the seventh aspect, refer to the foregoing description. Details are not described herein again.

Optionally, based on the sixth aspect, the receiving, by a positioning server, at least one piece of positioning support information may include receiving, by the positioning server, at least one piece of positioning support information sent by a control device. Correspondingly, based on the seventh aspect, the receiving unit may be further configured to receive at least one piece of positioning support information sent by a control device.

In the optional implementation, further, optionally, a distance between the control device and the to-be-positioned terminal falls within the preset range, and the at least one piece of positioning support information may further include positioning support information obtained in a process in which the control device executes a positioning packet interaction procedure with the at least one anchor in the preset anchor set. In this case, the at least one piece of positioning support information includes multiple pieces of positioning support information. Further, optionally, the at least one piece of positioning support information may further include positioning support information obtained in a process in which the to-be-positioned terminal executes a positioning packet interaction procedure with the at least one anchor in the preset anchor set.

Optionally, based on the sixth aspect or any optional implementation of the sixth aspect, the method may further include receiving, by the positioning server, a quality factor of the at least one piece of positioning support information. In this case, the positioning, by the positioning server, the to-be-positioned terminal according to the at least one piece of positioning support information may include positioning, by the positioning server, the to-be-positioned terminal according to positioning support information that is in the at least one piece of positioning support information and whose quality factor meets a preset condition.

Correspondingly, based on the seventh aspect or any optional implementation of the seventh aspect, the receiving unit may be further configured to receive a quality factor of positioning support information in the at least one piece of positioning support information. In this case, the positioning unit may be further configured to position the to-be-positioned terminal according to positioning support information that is in the at least one piece of positioning support information and whose quality factor meets a preset condition.

Optionally, based on the sixth aspect or any optional implementation of the sixth aspect, the positioning, by the positioning server, the to-be-positioned terminal according to the at least one piece of positioning support information may include positioning, by the positioning server, the to-be-positioned terminal according to positioning support information that is in the at least one piece of positioning support information and that is received within a preset time period, or positioning, by the positioning server, the to-be-positioned terminal according to a preset amount of positioning support information with a high receiving time priority in the at least one piece of positioning support information, where an earlier receiving time leads to a higher receiving time priority.

Correspondingly, based on the seventh aspect or any optional implementation of the seventh aspect, the positioning unit may be further configured to position the to-be-positioned terminal according to positioning support information that is in the at least one piece of positioning support information and that is received within a preset time period, or position the to-be-positioned terminal according to a preset amount of positioning support information with a high receiving time priority in the at least one piece of positioning support information. An earlier receiving time leads to a higher receiving time priority.

According to an eighth aspect, a control device is provided, where the control device includes at least one processor, an interface circuit, a memory, and a system bus. The memory is configured to store a computer executable instruction. The at least one processor, the interface circuit, and the memory are connected to each other using the system bus. When the control device runs, the at least one processor executes the computer executable instruction stored in the memory in order to perform the positioning method in any one of the second aspect or the optional manners of the second aspect.

According to a ninth aspect, a positioning terminal is provided, where the positioning terminal includes at least one processor, an interface circuit, a memory, and a system bus. The memory is configured to store a computer executable instruction. The at least one processor, the interface circuit, and the memory are connected to each other using the system bus. When the positioning terminal runs, the at least one processor executes the computer executable instruction stored in the memory such that a debug proxy performs the positioning method in any one of the fourth aspect or the optional manners of the fourth aspect.

According to a tenth aspect, a positioning server is provided, where the positioning server includes at least one processor, an interface circuit, a memory, and a system bus. The memory is configured to store a computer executable instruction. The at least one processor, the interface circuit, and the memory are connected to each other using the system bus. When the positioning server runs, the at least one processor executes the computer executable instruction stored in the memory such that a debug proxy performs the positioning method in any one of the sixth aspect or the optional manners of the sixth aspect.

According to an eleventh aspect, a computer readable storage medium is provided, where the computer readable storage medium stores one or more programs. The one or more programs include instructions. When at least one processor of a control device executes the instructions, the control device performs the positioning method in any one of the second aspect or the optional manners of the second aspect.

According to a twelfth aspect, a computer readable storage medium is provided, where the computer readable storage medium stores one or more programs. The one or more programs include instructions. When at least one processor of a positioning terminal executes the instructions, the positioning terminal performs the positioning method in any one of the fourth aspect or the optional manners of the fourth aspect.

According to a thirteenth aspect, a computer readable storage medium is provided, where the computer readable storage medium stores one or more programs. The one or more programs include instructions. When at least one processor of a positioning server executes the instructions, the positioning server performs the positioning method described in any one of the sixth aspect or the optional manners of the sixth aspect.

According to a fourteenth aspect, a positioning system is provided, where the system is used to position a to-be-positioned terminal, and includes the to-be-positioned terminal and at least one positioning terminal, and a distance between the at least one positioning terminal and the to-be-positioned terminal falls within a preset range. The positioning terminal is configured to receive an instruction message, and execute a positioning packet interaction procedure with at least one anchor in a preset anchor set according to the instruction message. The interaction procedure is used to enable the positioning terminal or the anchor that executes the interaction procedure to obtain positioning support information, and the positioning support information is used to enable a positioning server to position the to-be-positioned terminal to obtain position information of the positioning terminal and send the position information to the positioning terminal. The to-be-positioned terminal is configured to receive the position information of the at least one positioning terminal, and position the to-be-positioned terminal according to the position information of the at least one positioning terminal.

During specific implementation, optionally, the to-be-positioned terminal is further configured to use position information of one of the at least one positioning terminal as position information of the to-be-positioned terminal. Alternatively, the position information of the at least one positioning terminal may be calculated to obtain position information of the to-be-positioned terminal. Certainly, this does not constitute a limitation during specific implementation.

Optionally, the to-be-positioned terminal is further configured to receive a quality factor of the position information of the at least one positioning terminal. The quality factor of the position information is used to represent quality of the position information. The to-be-positioned terminal is further configured to position the to-be-positioned terminal according to position information whose quality factor meets a preset condition.

In the positioning system provided in the fourteenth aspect, the to-be-positioned terminal is positioned using positioning packet information obtained after the at least one positioning terminal whose distance from the to-be-positioned terminal falls within the preset range executes the positioning packet interaction procedure with the at least one anchor in the preset anchor set. The to-be-positioned terminal is positioned using the position information of the at least one positioning terminal. That is, the to-be-positioned terminal is positioned indirectly using the positioning packet information obtained after the at least one positioning terminal whose distance from the to-be-positioned terminal falls within the preset range executes the positioning packet interaction procedure with the at least one anchor in the preset anchor set. Therefore, for the to-be-positioned terminal, quality of the obtained positioning support information can be improved (for a specific analysis process, refer to the foregoing description) in order to improve quality of the position information, and improve precision of a positioning result.

According to a fifteenth aspect, a positioning method is provided, where the method is used to position a to-be-positioned terminal, and may include receiving, by a positioning terminal, an instruction message, and executing a positioning packet interaction procedure with at least one anchor in a preset anchor set according to the instruction message, where a distance between the positioning terminal and the to-be-positioned terminal falls within a preset range, the interaction procedure is used to enable the positioning terminal or the anchor that executes the interaction procedure to obtain positioning support information, and the positioning support information is used to enable a positioning server to position the to-be-positioned terminal, to obtain position information of the positioning terminal, receiving, by the positioning terminal, the position information of the positioning terminal that is sent by the positioning server, and sending the position information of the positioning terminal to the to-be-positioned terminal such that the to-be-positioned terminal positions the to-be-positioned terminal according to the position information of the positioning terminal.

During specific implementation, the to-be-positioned terminal may position the to-be-positioned terminal according to position information of multiple positioning terminals whose distances from the to-be-positioned terminal fall within the preset range.

Correspondingly, according to a sixteenth aspect, a positioning terminal is provided, where the positioning terminal is configured to position a to-be-positioned terminal, a distance between the positioning terminal and the to-be-positioned terminal falls within a preset range, and the positioning terminal includes a receiving unit, an execution unit, and a sending unit. The receiving unit is configured to receive an instruction message. The execution unit is configured to execute a positioning packet interaction procedure with at least one anchor in a preset anchor set according to the instruction message. The interaction procedure is used to enable the positioning terminal or the anchor that executes the interaction procedure to obtain positioning support information, and the positioning support information is used to enable a positioning server to position the to-be-positioned terminal, to obtain position information of the positioning terminal. The receiving unit is configured to receive the position information of the positioning terminal that is sent by the positioning server. The sending unit is configured to send the position information of the positioning terminal to the to-be-positioned terminal such that the to-be-positioned terminal positions the to-be-positioned terminal according to the position information of the positioning terminal.

For beneficial effects that can be achieved by the positioning method provided in the fifteenth aspect and the positioning terminal provided in the sixteenth aspect, refer to the positioning system provided in the fourteenth aspect. Details are not described herein again.

According to a seventeenth aspect, a positioning method is provided, where the method is used to position a to-be-positioned terminal, and may include receiving, by the to-be-positioned terminal, position information of at least one positioning terminal that is sent by the at least one positioning terminal, where a distance between the at least one positioning terminal and the to-be-positioned terminal falls within a preset range, and positioning, by the to-be-positioned terminal, the to-be-positioned terminal according to the position information of the at least one positioning terminal.

Optionally, the method may further include receiving, by the to-be-positioned terminal, a quality factor of the position information of the at least one positioning terminal. The quality factor of the position information is used to represent quality of the position information. In this case, the positioning, by the to-be-positioned terminal, the to-be-positioned terminal according to the position information of the at least one positioning terminal may include positioning, by the to-be-positioned terminal, the to-be-positioned terminal according to position information that is in the position information of the at least one positioning terminal and whose quality factor meets a preset condition.

According to an eighteenth aspect, a to-be-positioned terminal is provided, where the to-be-positioned terminal is configured to position the to-be-positioned terminal, and the to-be-positioned terminal may include a receiving unit and a positioning unit. The receiving unit is configured to receive position information of at least one positioning terminal that is sent by the at least one positioning terminal, where a distance between the at least one positioning terminal and the to-be-positioned terminal falls within a preset range. The positioning unit is configured to position the to-be-positioned terminal according to the position information of the at least one positioning terminal.

Optionally, the receiving unit is further configured to receive a quality factor of the position information of the at least one positioning terminal. In this case, the positioning unit is configured to position the to-be-positioned terminal according to position information that is in the position information of the at least one positioning terminal and whose quality factor meets a preset condition.

For beneficial effects that can be achieved by the positioning method provided in the seventeenth aspect and the to-be-positioned terminal provided in the eighteenth aspect, refer to the positioning system provided in the fourteenth aspect. Details are not described herein again.

According to a nineteenth aspect, a positioning terminal is provided, where the positioning terminal includes at least one processor, an interface circuit, a memory, and a system bus. The memory is configured to store a computer executable instruction. The at least one processor, the interface circuit, and the memory are connected to each other using the system bus. When the positioning terminal runs, the at least one processor executes the computer executable instruction stored in the memory such that a debug proxy performs the positioning method in the fifteenth aspect.

According to a twentieth aspect, a to-be-positioned terminal is provided, where the to-be-positioned terminal includes at least one processor, an interface circuit, a memory, and a system bus. The memory is configured to store a computer executable instruction. The at least one processor, the interface circuit, and the memory are connected to each other using the system bus. When the to-be-positioned terminal runs, the at least one processor executes the computer executable instruction stored in the memory such that a debug proxy performs the positioning method in any one of the seventeenth aspect or the optional manners of the seventeenth aspect.

According to a twenty-first aspect, a computer readable storage medium is provided, where the computer readable storage medium stores one or more programs. The one or more programs include instructions. When at least one processor of a positioning terminal executes the instructions, the positioning terminal performs the positioning method in the fifteenth aspect.

According to a twenty-second aspect, a computer readable storage medium is provided, where the computer readable storage medium stores one or more programs. The one or more programs include instructions. When at least one processor of a to-be-positioned terminal executes the instructions, the to-be-positioned terminal performs the positioning method in any one of the seventeenth aspect or the optional manners of the seventeenth aspect.

DESCRIPTION OF EMBODIMENTS

If there is no obstacle between a to-be-positioned terminal and an anchor, a communication channel between the anchor and the to-be-positioned terminal is a LOS channel. If there is an obstacle between a to-be-positioned terminal and an anchor, a communication channel between the anchor and the to-be-positioned terminal is an NLOS channel. Precision of positioning support information obtained based on an NLOS channel is lower than that of positioning support information obtained based on a LOS channel. It is quite common that during actual implementation, there is an obstacle between a to-be-positioned terminal and an anchor. Therefore, if positioning is performed according to the method described in the background, a finally obtained positioning result is inaccurate.

Figure 1:
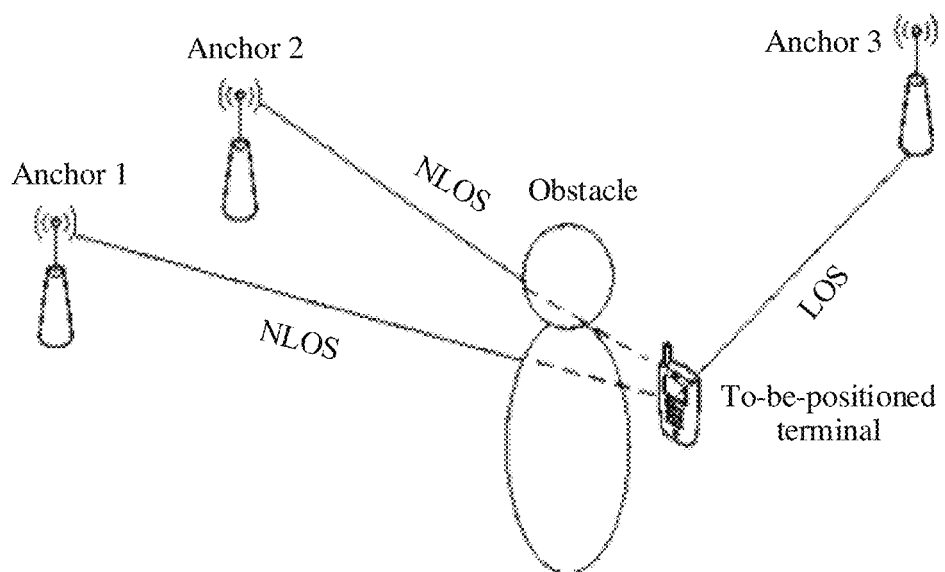
FIG. 1 is a schematic architectural diagram of a positioning system.

For example, as shown in FIG. 1, FIG. 1 is a schematic architectural diagram of a positioning system applicable to the background. The positioning system shown in FIG. 1 includes a to-be-positioned terminal and three anchors (respectively represented as anchors 1, 2, and 3). A channel between the to-be-positioned terminal and each of the anchors 1 and 2 is an NLOS channel, and a channel between the to-be-positioned terminal and the anchor 3 is a LOS channel. In FIG. 1, a wireless signal exchanged between the to-be-positioned terminal and each of the anchors 1 and 2 may be severely attenuated and reflected in a transmission process due to an obstacle. Consequently, performance (or referred to as "quality") of the signal is relatively poor, quality of positioning support information obtained in a process in which the to-be-positioned terminal executes a positioning packet interaction procedure with each of the anchors 1 and 2 is relatively poor, and a positioning result obtained using the positioning support information is inaccurate.

It should be noted that there are usually multiple obstacles during actual implementation, and the obstacles may be fixed (such as a shelf, furniture, or a machine that is fixed at a position), or may be movable (such as a moving person or car). In this way, an actual environment is complex and variable, and a positioning result obtained using the method described in the background is inaccurate.

In addition, a communication capability of a terminal is limited. For example, a terminal cannot communicate with an anchor whose distance from the terminal is greater than a threshold, or cannot perform communication in an environment in which signal strength is relatively poor. Consequently, quality of positioning support information obtained in a process in which the terminal executes a positioning packet interaction procedure with the anchor is relatively poor, and a positioning result obtained using the positioning support information is inaccurate.

On this basis, embodiments of the present disclosure provide a positioning system, method, and apparatus. A basic principle of the embodiments of the present disclosure is as follows. A to-be-positioned terminal is positioned using positioning packet information obtained after at least one positioning terminal whose distance from the to-be-positioned terminal falls within a preset range executes a positioning packet interaction procedure with at least one anchor in a preset anchor set. In this way, in some cases, a channel between each anchor and at least one positioning terminal in the system provided in the embodiments of the present disclosure may be a LOS channel in order to improve quality of the obtained positioning support information. In some other cases, in the system provided in the embodiments of the present disclosure, a to-be-positioned terminal may be positioned using positioning packet information obtained after at least one positioning terminal executes a positioning packet interaction procedure with at least one anchor in a preset anchor set in order to avoid a problem that quality of positioning support information is relatively poor due to an insufficient communication capability of a single terminal (a to-be-positioned terminal herein), improve quality of the positioning support information, and improve precision of a positioning result.

Particularly, when the preset range is relatively small, a quantity of positioning terminals whose distances from the to-be-positioned terminal fall within the preset range is relatively large, and a quantity of positions of the positioning terminals whose distances from the to-be-positioned terminal fall within the preset range is relatively large, a better effect is achieved by the technical solutions provided in the embodiments of the present disclosure. That is, the technical solutions provided in the embodiments of the present disclosure are particularly applicable to a scenario in which there are many positioning terminals. For example, the technical solutions are applicable to a scenario in which a person carries a positioning terminal such as a BLUETOOTH headset, a smartphone, a smart band, smart glasses, or smart shoes, or a scenario in which a vehicle carries a positioning terminal such as an intelligent in-vehicle device or an intelligent device carried by a driver or a passenger on the vehicle.

Figure 2:
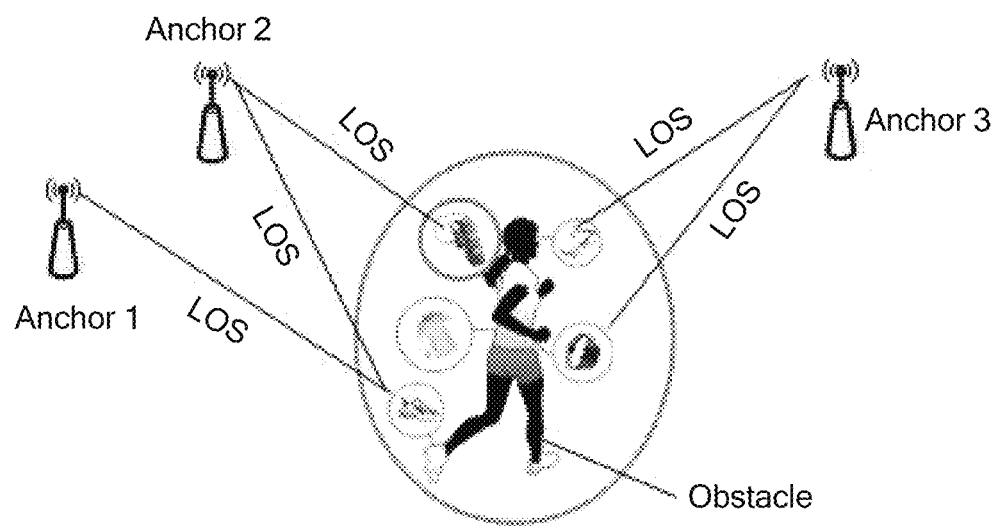
FIG. 2 is a schematic architectural diagram of a positioning system according to an embodiment of the present disclosure.

As shown in FIG. 2, FIG. 2 is a schematic diagram of a positioning system according to an embodiment of the present disclosure. An example in which a person carries multiple intelligent devices is used for description in FIG. 2. Any intelligent device may be used as a to-be-positioned terminal. After one of the intelligent devices is used as the to-be-positioned terminal, the remaining intelligent devices may be used as positioning terminals. Any intelligent device may be used as a control device. In addition, the control device may be a device other than these intelligent devices.

In the following, some terms in this application are described in order to help a person skilled in the art have a better understanding.

(1) Anchor: An anchor is a device that is deployed in a positioning area, has a known position, has a wireless transmitting and receiving function, and can transmit and receive a positioning packet in a particular communications standard. One or more wireless transceivers can be disposed on each anchor, and quantities of wireless transceivers disposed on different anchors may be the same, or may be different.

(2) To-be-positioned terminal: A to-be-positioned terminal is a device that is deployed in a positioning area, has an unknown position, has a wireless transmitting and receiving function, can exchange a positioning packet with an anchor, and has a positioning requirement. The to-be-positioned terminal may include but is not limited to a smartphone, a wearable intelligent device, and an intelligent in-vehicle device. One or more wireless transceivers can be disposed on the to-be-positioned terminal.

(3) Positioning terminal: A positioning terminal is a device that is deployed in a positioning area, has an unknown position, has a wireless transmitting and receiving function, and can exchange a positioning packet with an anchor, where a distance between the device and a to-be-positioned terminal falls within a preset range. One or more wireless transceivers can be disposed on each positioning terminal, and quantities of wireless transceivers disposed on different positioning terminals may be the same, or may be different.

For example, during specific implementation, functions of a positioning terminal provided in the embodiments of the present disclosure may be added to an existing positioning terminal (such as a smartphone, a wearable intelligent device, or an intelligent in-vehicle device) in order to implement the positioning terminal provided in the embodiments of the present disclosure. Alternatively, a control device may distribute functions of a positioning terminal provided in the embodiments of the present disclosure to some terminals (which may not be existing positioning terminals) in a software form in order to use each of the terminals as the positioning terminal provided in the embodiments of the present disclosure.

It should be noted that a to-be-positioned terminal in one scenario may be used as a positioning terminal in another scenario. For example, it is assumed that a person wears multiple wearable intelligent devices that further include a device 1, a device 2, a device 3, and a device 4, and each wearable intelligent device is a device having the following features "being deployed in a positioning area, having an unknown position, having a wireless transmitting and receiving function, and being capable of exchanging a positioning packet with an anchor." If the device 1 needs to be positioned (that is, the device 1 has a positioning requirement), the device 1 is a to-be-positioned terminal, and the device 2, the device 3, and the device 4 each can be used as a positioning terminal. If the device 2 needs to be positioned (that is, the device 2 has a positioning requirement), the device 2 is a to-be-positioned terminal, and the device 1, the device 3, and the device 4 each can be used as a positioning terminal.

(4) Control device: A control device is a terminal-side management device in a positioning system, and is configured to implement information exchange between a terminal-side device and a positioning server. The terminal-side device may include each positioning terminal, a to-be-positioned terminal, and each anchor in a preset anchor set.

For example, during specific implementation, any terminal in the positioning system can be used as the control device. Optionally, any terminal whose distance from a to-be-positioned terminal falls within a preset range is used as the control device. Further, optionally, a terminal (which may be a positioning terminal, may be a to-be-positioned terminal, or may be neither a positioning terminal nor a to-be-positioned terminal) that has a relatively favorable communication and a relatively favorable processing capability and whose distance from a to-be-positioned terminal falls within a preset range is used as the control device. Further, a terminal may be selected, as the control device by means of negotiation, from terminals whose distances from the to-be-positioned terminal fall within the preset range. A manner of the negotiation is not limited in the embodiments of the present disclosure, and any manner may be used to implement the negotiation.

It should be noted that the control device may be implemented by adding a management function module to the positioning terminal or the to-be-positioned terminal, or may be implemented by adding a management function module to a non-positioning terminal or a non-to-be-positioned terminal, or may be a dedicated management device or the like. If a positioning terminal whose distance from the to-be-positioned terminal falls within the preset range is used as the control device, the control device may further execute a positioning packet interaction procedure with at least one anchor in a preset anchor set. An example in which the control device, the positioning terminal, and the to-be-positioned terminal are independent devices is used for description below.

(5) Positioning server: A positioning server is a device that positions a to-be-positioned terminal using positioning support information and a positioning algorithm. In specific different positioning technologies, implementation forms of the positioning server are different. For example, in some positioning technologies, the positioning server is a network-side device, and communicates with a positioning terminal and an anchor as an independent server, or the positioning server is integrated into an anchor, and implements positioning by means of communication between an anchor and a positioning terminal. In some other positioning technologies, the positioning server is a terminal-side device, or the positioning server is directly integrated into a positioning terminal or a to-be-positioned terminal, and implements positioning by communicating with an anchor. Because the present disclosure is applicable to any positioning technology, an independent device and an integrated device that implement a function of the positioning server in the present disclosure are collectively referred to as the positioning server. However, it may be understood that the positioning server may be independently disposed, or may be disposed together with another device (such as an application server or any anchor, a positioning terminal, or a to-be-positioned terminal in a positioning system). For ease of description, an example in which the positioning server is an independently disposed network-side device is used for description below. However, a specific implementation form of the positioning server does not affect specific implementations of the present disclosure in different positioning technologies. The positioning server may position to-be-positioned terminals in multiple positioning areas. Division of positioning areas is not limited in the embodiments of the present disclosure. For example, a positioning area may be a campus, a factory, or a shopping mall. Multiple anchors are disposed in each positioning area, and the multiple anchors are three or more anchors.

(6) The term "and/or" in this specification describes only an association relationship for describing associated objects and represents that three relationships may exist. For example, A and/or B may represent the following three cases, where only A exists, both A and B exist, and only B exists. In addition, the character "/" in this specification generally indicates an "or" relationship between the associated objects.

"Multiple" in this specification means two or more than two. Words such as "first" and "second" in this specification are used to distinguish between same items or similar items with basically same functions or purposes. A person skilled in the art may understand that the words such as "first" and "second" do not limit a quantity and an implementation sequence.

Figure 3A:
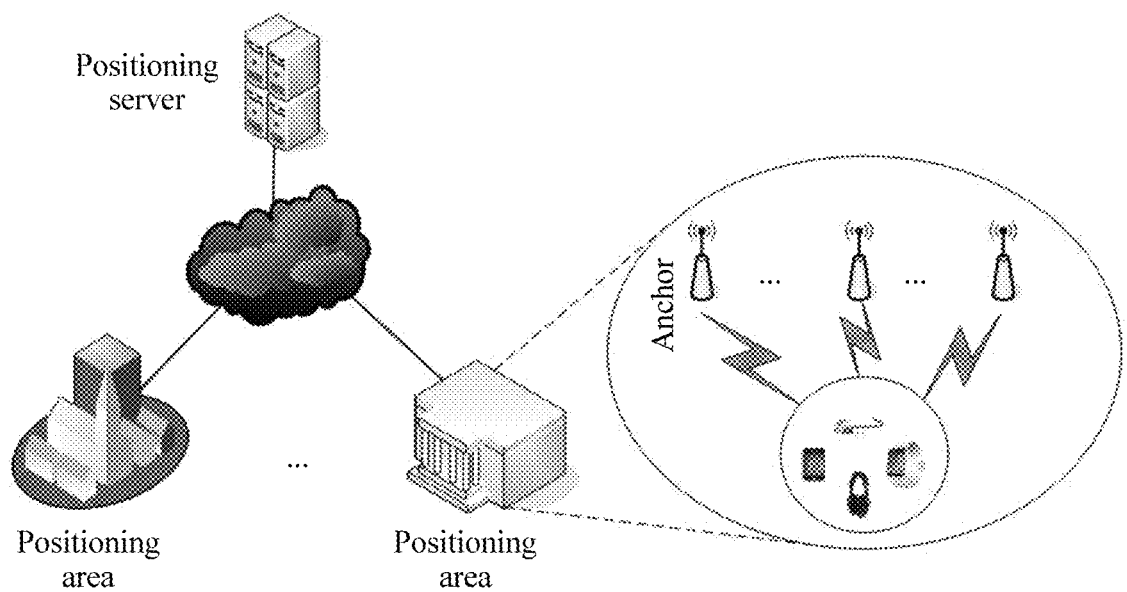
FIG. 3A is a schematic architectural diagram of another positioning system according to an embodiment of the present disclosure.

As shown in FIG. 3A, FIG. 3A is a schematic architectural diagram of a positioning system according to an embodiment of the present disclosure. The positioning system shown in FIG. 3A includes a preset anchor set, a positioning server, and at least one positioning terminal. A distance between the positioning terminal and a to-be-positioned terminal falls within a preset range. The positioning terminal is configured to receive an instruction message, and execute a positioning packet interaction procedure with at least one anchor in the preset anchor set. The interaction procedure is used to enable the positioning terminal or the anchor that executes the interaction procedure to obtain positioning support information. The positioning server is configured to receive the positioning support information, and position the to-be-positioned terminal according to the positioning support information.

Figure 3B:
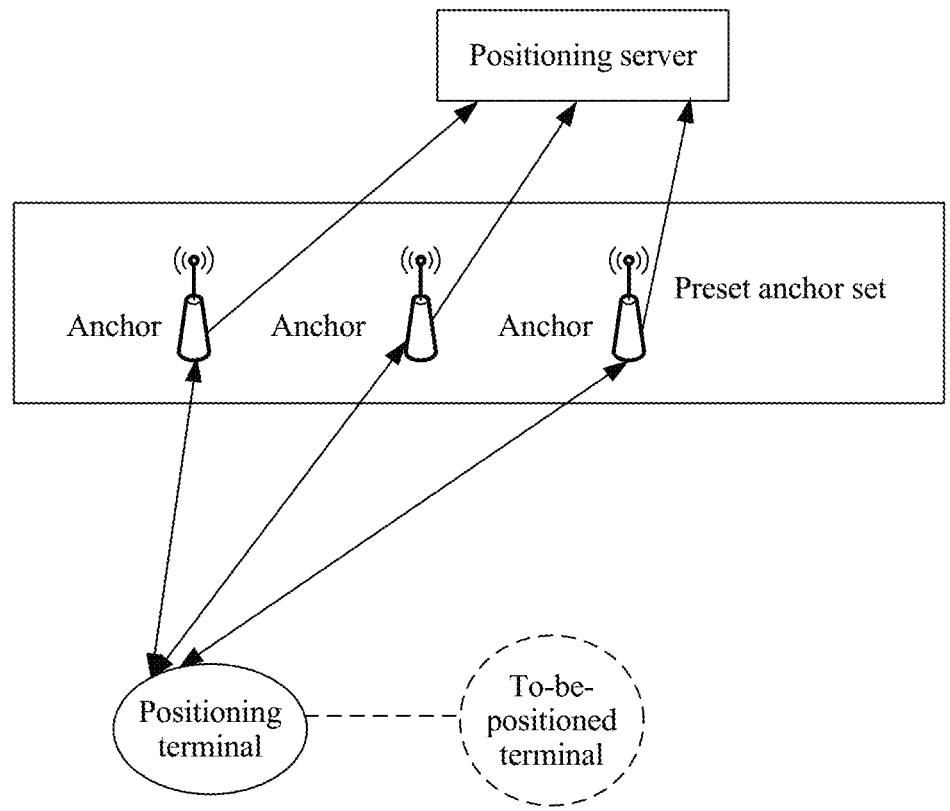
FIG. 3B is a schematic architectural diagram of another positioning system according to an embodiment of the present disclosure.

As shown in FIG. 3B, FIG. 3B is a schematic architectural diagram of another positioning system according to an embodiment of the present disclosure. A double-headed arrow in FIG. 3B represents a positioning packet interaction procedure between an anchor and a positioning terminal, a single-headed arrow means that an anchor sends positioning support information to a positioning server, and a dashed line represents a distance between a positioning terminal and a to-be-positioned terminal. In addition, the to-be-positioned terminal is represented by a dashed line to indicate that the to-be-positioned terminal may be not a device in the positioning system, or may be a device in the positioning system. In FIG. 3B, description is provided using an example in which a preset anchor set includes three anchors, at least one positioning terminal includes one positioning terminal, each anchor may execute a positioning packet interaction procedure with the positioning terminal, and positioning support information is obtained by the anchors.

The preset anchor set is a set that includes some or all anchors in a positioning area in which the to-be-positioned terminal is located. A specific value of a "preset range" is not limited in this embodiment of the present disclosure, and may be further set according to an actual situation. The at least one positioning terminal in this embodiment of the present disclosure may be understood as at least one positioning terminal in a neighborhood range of the to-be-positioned terminal.

The positioning terminal may be further configured to receive an instruction message sent by the to-be-positioned terminal, the positioning server, or a control device in the following optional implementation. That the positioning terminal executes the positioning packet interaction procedure with the at least one anchor in the preset anchor set according to the instruction message may further include the positioning terminal executes the positioning packet interaction procedure with the at least one anchor in the preset anchor set after being triggered by the instruction message.

That the positioning terminal executes the positioning packet interaction procedure with the at least one anchor in the preset anchor set may include the positioning terminal executes a positioning packet interaction procedure with each anchor that is in the preset anchor set and that supports a first communications standard. Further, the control device instructs the positioning terminal to control, according to a positioning algorithm used in the positioning system, each wireless transceiver on the positioning terminal to implement a positioning packet interaction procedure with each anchor that is in the preset anchor set and that supports the first communications standard. The first communications standard is any communications standard supported by the positioning terminal.

Each anchor may support one or more communications standards, and different anchors may support different types of communications standards. Each positioning terminal may support one or more communications standards, and different positioning terminals may support different types of communications standards. During specific implementation, each positioning terminal may execute, using any communications standard supported by the positioning terminal, a positioning packet interaction procedure with an anchor that supports the communications standard. The communications standard used in this embodiment of the present disclosure may be any wireless communications standard that may include but is not limited to BLUETOOTH, WI-FI, ZIGBEE, ultra-wideband (UWB), a Global Positioning System (GPS), and a cellular signal. A second communications standard may be any communications standard supported by the positioning terminal.

For a process of a positioning packet interaction procedure between each positioning terminal and an anchor, refer to the other approaches. Two devices including an anchor and a positioning terminal are used in the interaction procedure. A device in the two devices that obtains positioning support information and positioning support information that is to be obtained are related to a positioning algorithm used in the positioning system. For a specific implementation, refer to the other approaches. For example, an anchor 1 and a positioning terminal 1 are used in an interaction procedure between the anchor 1 and the positioning terminal 1. A device in the anchor 1 and the positioning terminal 1 that obtains positioning support information and positioning support information that is to be obtained are related to a positioning algorithm used in the positioning system. For a specific implementation, refer to the other approaches. That is, in this embodiment of the present disclosure, a mechanism of obtaining positioning support information based on a positioning algorithm is not changed. However, adjustment is further made on this basis in this embodiment of the present disclosure. For example, in a process of obtaining positioning support information or after the process, identifiers of two interaction parties in the interaction procedure, a quality factor of the positioning support information, or the like may be further obtained. For details, refer to the following description.

A positioning algorithm used in the positioning system is a positioning algorithm used when the positioning server positions the to-be-positioned terminal. In positioning packet interaction procedures based on different positioning algorithms, used positioning packets and used positioning packet interaction sequences may be different. For a specific implementation, refer to the other approaches. For example, the positioning algorithm may be any positioning algorithm based on a wireless communications technology, for example, a ranging-based positioning algorithm or a position fingerprint-based positioning algorithm. The ranging-based positioning algorithm includes but is not limited to a TOA algorithm, a time difference of arrival (TDOA) algorithm, an AOA algorithm, a received signal strength indicator (RSSI) ranging algorithm, and a channel state information (CSI) ranging algorithm. The position fingerprint-based positioning algorithm may include but is not limited to an RSSI fingerprinting algorithm and a CSI fingerprinting algorithm.

Positioning support information is information related to a positioning algorithm and used to implement positioning. In this embodiment of the present disclosure, if the positioning algorithm is the TOA, the positioning support information may be a travel time or a travel distance of a signal between each positioning terminal (including a control device and a positioning terminal) and each anchor. If the positioning algorithm is the TDOA, the positioning support information may be a travel time difference, a travel distance difference, or the like of a signal between each positioning terminal and each anchor. Other examples are not enumerated.

That the positioning support information is used to enable the positioning server to position the to-be-positioned terminal may further include positioning support information whose quality meets a condition is used to enable the positioning server to position the to-be-positioned terminal. The positioning support information whose quality meets the condition is positioning support information whose quality is relatively favorable. In the following optional implementation, quality of the positioning support information may be measured according to a quality factor. Alternatively, that the positioning support information is used to enable the positioning server to position the to-be-positioned terminal may further include positioning the to-be-positioned terminal according to positioning support information received within a preset time period, or positioning the to-be-positioned terminal according to a preset amount of positioning support information with a high receiving time priority in at least one piece of positioning support information, where an earlier receiving time leads to a higher receiving time priority. Certainly, this does not constitute a limitation during specific implementation.

In the positioning system provided in this embodiment of the present disclosure, the to-be-positioned terminal is positioned using positioning packet information obtained after the at least one positioning terminal whose distance from the to-be-positioned terminal falls within the preset range executes the positioning packet interaction procedure with the at least one anchor in the preset anchor set. A position of the positioning terminal whose distance from the to-be-positioned terminal falls within the preset range is usually different from a position of the to-be-positioned terminal. Therefore, although an obstacle blocks communication between the to-be-positioned terminal and an anchor, the obstacle cannot block communication between a positioning terminal in another position and the anchor. In this way, a channel between each anchor and the at least one positioning terminal may be a LOS channel in order to improve quality of the obtained positioning support information, and improve precision of a positioning result. In addition, different terminals (including a positioning terminal and a to-be-positioned terminal) provide different communication capabilities. Therefore, in the system provided in this embodiment of the present disclosure, the to-be-positioned terminal may be positioned using positioning packet information obtained after the at least one positioning terminal executes the positioning packet interaction procedure with the at least one anchor in the preset anchor set in order to avoid a problem that quality of the positioning support information is relatively poor due to an insufficient communication capability of a single terminal (a to-be-positioned terminal herein), and improve precision of a positioning result.

Optionally, the system may further include a control device configured to determine a positioning request for positioning the to-be-positioned terminal, and send the instruction message to the at least one positioning terminal.

In this embodiment of the present disclosure, the control device is considered as a terminal-side management device in the positioning system, and is configured to implement information exchange between each positioning terminal, the to-be-positioned terminal, each anchor in the preset anchor set, and the positioning server. Correspondingly, the positioning terminal, the to-be-positioned terminal, and each anchor in the preset anchor set are managed devices in the positioning system. Optionally, any terminal in the positioning system can be used as the control device. Optionally, any terminal whose distance from the to-be-positioned terminal falls within the preset range is used as the control device. Further, optionally, a positioning terminal that has a relatively favorable communication capability and a relatively favorable processing capability and whose distance from the to-be-positioned terminal falls within the preset range is used as the control device. Further, a terminal may be selected, as the control device by means of negotiation, from terminals whose distances from the to-be-positioned terminal fall within the preset range. A manner of the negotiation is not limited in this embodiment of the present disclosure. For example, any manner may be used to implement the negotiation.

For example, the control device may trigger generation of a positioning request, or receive a positioning request sent by any device (such as the positioning server, the anchor, the positioning terminal, or the to-be-positioned terminal) other than the control device in the positioning system. That the control device sends the instruction message to the at least one positioning terminal may include the control device broadcasts the instruction message.

In the optional implementation, the control device has a function of managing the at least one positioning terminal that is further a function of sending the instruction message to the at least one positioning terminal. In this way, when the at least one positioning terminal includes multiple positioning terminals, management performance of the system can be improved. A position relationship between the control device and the to-be-positioned terminal is not limited in this embodiment of the present disclosure.

Optionally, the control device may be further configured to execute a positioning packet interaction procedure with the at least one anchor in the preset anchor set. In the optional implementation, the control device further has a function of the positioning terminal. In the optional implementation, optionally, a distance between the control device and the to-be-positioned terminal falls within the preset range. In this way, the to-be-positioned terminal is positioned using positioning packet information that is obtained after the control device whose distance from the to-be-positioned terminal falls within the preset range and the at least one positioning terminal separately execute the positioning packet interaction procedure with the at least one anchor in the preset anchor set in order to further improve precision of a positioning result.

After the control device determines the positioning request, a process of "executing the positioning packet interaction procedure with each anchor that is in the preset anchor set and that supports the first communications standard" and a process of "sending the instruction message to the at least one positioning terminal" may be executed without following a sequence.

Optionally, the to-be-positioned terminal may be further configured to execute a positioning packet interaction procedure with the at least one anchor in the preset anchor set. In this way, the to-be-positioned terminal is positioned using positioning packet information that is obtained after the to-be-positioned terminal, the control device whose distance from the to-be-positioned terminal falls within the preset range, and the at least one positioning terminal separately execute the positioning packet interaction procedure with the at least one anchor in the preset anchor set in order to further improve precision of a positioning result.

Optionally, a device that obtains positioning support information is further configured to send the obtained positioning support information to the control device. In this case, the control device is further configured to send the positioning support information to the positioning server.

The device that obtains the positioning support information may include at least one of the anchor, the positioning terminal, the to-be-positioned terminal, or the control device. In the optional implementation, a device that obtains positioning support information other than the control device can send the obtained positioning support information to the control device. Then, the control device sends the positioning support information to the positioning server together. During specific implementation, the control device may be used only for forwarding, or may summarize the positioning support information (for example, distinguish between positioning support information in one group) and then send the summarized positioning support information to the positioning server.

It should be noted that during specific implementation, in principle, the obtained positioning support information may be directly reported to the positioning server as long as the device that obtains the positioning support information has a function module exchanging the positioning support information with the positioning server. For ease of management, the positioning support information is usually reported in the foregoing optional implementation.

Optionally, the device that obtains the positioning support information is further configured to obtain at least one piece of the following information an identifier of a group, identifiers of two interaction parties in the interaction procedure, or a quality factor of the positioning support information. The quality factor of the positioning support information is used to represent quality of the positioning support information. Optionally, the device that obtains the positioning support information may directly send the at least one piece of information to the positioning server, or may send the at least one piece of information to the positioning server using the control device. The at least one piece of information is used to enable the positioning server to position the to-be-positioned terminal.

The group is a set that includes some or all terminals whose distances from the to-be-positioned terminal fall within the preset range. For example, if the distance between the control device and the to-be-positioned terminal falls beyond the preset range, the group may be a set that includes the to-be-positioned terminal and the at least one positioning terminal. If the distance between the control device and the to-be-positioned terminal falls within the preset range, the group may be a set that includes the to-be-positioned terminal, the at least one positioning terminal, and the control device.

The identifier of the group refers to a character or a character string that can uniquely identify a group in the positioning system. One positioning server may manage multiple positioning areas, one positioning area may include one or more groups, and to-be-positioned terminals in multiple groups may be positioned in the positioning system at a same moment. Therefore, an identifier of a group specific to the positioning support information is sent to the positioning server such that the positioning server can know a group in which a to-be-positioned terminal that is positioned using the positioning support information is located. If the device that obtains the positioning support information is the positioning terminal, the positioning terminal may learn of the identifier of the group when establishing the group. If the device that obtains the positioning support information is the anchor, in a process in which the anchor executes a positioning packet interaction procedure with the positioning terminal, the anchor may receive the identifier of the group that is sent by the positioning terminal, to learn of the identifier of the group.

The identifiers of two interaction parties in the interaction procedure may be used to uniquely mark one piece of positioning support information. In a positioning process, an amount of positioning support information is relatively large. Therefore, after each piece of positioning support information is marked, the positioning server can identify different positioning support information. For example, the interaction procedure is an interaction procedure between the anchor 1 and the positioning terminal 1, and therefore, the identifiers of two interaction parties may be an identifier of the anchor 1 and an identifier of the positioning terminal 1. Further, each of the two interaction parties may include one or more transceiver antennas, and different transceiver antennas corresponding to different channels. Therefore, further, the identifiers of two interaction parties in the interaction procedure may be identifiers of specific wireless transceivers of the two interaction parties. For example, the interaction procedure is an interaction procedure between a wireless transceiver A of the anchor 1 and a wireless transceiver b of the positioning terminal 1, and therefore, the identifiers of two interaction parties may be an identifier of the wireless transceiver A of the anchor 1 and an identifier of the wireless transceiver b of the positioning terminal 1. An identifier of a wireless transceiver may be further a Media Access Control (MAC) address of the wireless transceiver. The device that obtains the positioning support information may learn of the identifiers of two interaction parties in the interaction procedure when executing the positioning packet interaction procedure.

The quality factor of the positioning support information is used to represent quality of the positioning support information. The positioning server may select, according to the quality factor of the positioning support information, positioning support information whose quality is relatively favorable to position the to-be-positioned terminal in order to further improve precision of a positioning result. During specific implementation, the device that obtains the positioning support information may be further configured to obtain the quality factor of the positioning support information after obtaining the positioning support information.

Optionally, the device that obtains the positioning support information is further configured to obtain the quality factor of the positioning support information according to at least one piece of the following information.

(1) Whether a transmission channel of a positioning packet is a LOS channel. Quality of positioning support information obtained based on a positioning packet transmitted on the LOS channel is usually better than quality of positioning support information obtained based on a positioning packet transmitted on an NLOS channel. There are many disclosed methods for processing a received packet by a receiving party to determine whether a transmission channel of the received packet is a LOS channel. This is not limited in this embodiment of the present disclosure.

(2) A signal-to-noise ratio of a positioning packet. A higher signal-to-noise ratio of the positioning packet leads to better quality of positioning support information obtained based on the positioning packet. There are many disclosed methods for processing a received packet by a receiving party to determine a signal-to-noise ratio of the received packet. This is not limited in this embodiment of the present disclosure.

(3) A wireless signal bandwidth used during positioning packet transmission.

(4) An ADC sampling rate that is of a receiver and used during positioning packet transmission.

Some positioning support information is obtained based on time measurement of a received positioning packet. The positioning support information may include but is not limited to a signal time of flight, a signal arrival phase, a CSI, and other positioning support information obtained by means of calculation according to these types of positioning support information. For the positioning support information, a larger wireless signal bandwidth used during positioning packet transmission leads to a higher ADC sampling rate of the receiver and better quality of the obtained positioning support information. Both the wireless signal bandwidth used during positioning packet transmission and the ADC sampling rate that is of the receiver and used during positioning packet transmission belong to wireless transceiver information, and the device that obtains the positioning support information may directly obtain, using a corresponding wireless transceiver software and hardware interface, the wireless signal bandwidth used during positioning packet transmission or the ADC sampling rate that is of the receiver and used during positioning packet transmission.

(5) Stability of positioning support information obtained for multiple times within a preset time period. Further, stability of same positioning support information is obtained for multiple times within the preset time period. An identifier of the positioning support information may be represented by identifiers of two interaction parties, in an interaction procedure, that obtain the positioning support information. During specific implementation, the stability of the positioning support information may be estimated using a measurement value variance. A smaller variance leads to better quality of the positioning support information.

It should be noted that during specific implementation, a quantized value (such as an integer whose value range is [0, 100]) of the quality factor in each dimension and a weight value of the quantized value corresponding to each dimension may be assigned according to an actual situation of the positioning support information in each dimension (that is, the information (1) to the information (5)). Therefore, the quality factor of the positioning support information is calculated according to the quantized value and the weight value.

Optionally, the at least one piece of information includes the quality factor of the positioning support information. That the positioning server may be further configured to receive the quality factor of the positioning support information from the device that obtains the positioning support information may further include receiving the quality factor that is of the positioning support information and that is sent by the device that obtains the positioning support information, or receiving, from the device that obtains the positioning support information, the quality factor that is of the positioning support information and that is sent by the control device. In this case, the positioning server may be further configured to position the to-be-positioned terminal according to positioning support information whose quality factor meets a preset condition.

The positioning support information whose quality factor meets the preset condition is positioning support information whose quality factor is relatively high that may be further positioning support information whose quality factor is greater than or equal to a preset threshold, a preset amount of positioning support information that ranks higher and that is obtained after positioning support information is ranked in descending order of quality factors, or the like.

For example, the positioning server may be further configured to summarize positioning support information with a same group identifier to form a positioning support information table, then rank all positioning support information in the positioning support information table according to a quality factor, and next position the to-be-positioned terminal using the first 100 pieces of positioning support information obtained after the ranking.

Each record in the positioning support information table may include the following information an identifier of a group, positioning support information, identifiers of two interaction parties, in an interaction procedure, that obtain the positioning support information, a quality factor of the positioning support information, and the like. Optionally, each record may further include a receiving time stamp, and the receiving time stamp is used to record a time at which the positioning server receives the positioning support information.

It should be noted that during actual implementation, some positioning support information has time validity. For example, in a process in which a person is walking, positioning support information obtained by the positioning system has time validity. For example, a walking speed of a person is usually 1 meter per second (m/s) to 2 m/s. In this case, the positioning server may set an aging time of the positioning support information, for example, may set the aging time to 2 seconds (s). In this way, in a process in which the positioning server positions the to-be-positioned terminal, the positioning server automatically filters out positioning support information whose receiving time stamp exceeds 2 s in order to improve precision of a positioning result.

Optionally, the positioning server may further position the to-be-positioned terminal in any one of the following manners that do not constitute a limitation.

Manner 1: The to-be-positioned terminal is positioned according to positioning support information received within a preset time period. For example, the preset time period may be a time period in which timing is started from a moment at which the positioning server starts to receive the first positioning support information. A specific value of the preset time period is not limited in this embodiment of the present disclosure. It should be noted that a longer preset time period does not necessarily lead to higher positioning precision. For specific reasons, refer to the time validity of the positioning support information described above.

Manner 2: The to-be-positioned terminal is positioned according to a preset amount of positioning support information with a high receiving time priority in the at least one piece of positioning support information. An earlier receiving time leads to a higher receiving time priority. Further, the positioning server positions the to-be-positioned terminal using the preset amount of positioning support information that is first received. A specific value of the preset amount is not limited in this embodiment of the present disclosure.

In the two implementations, the positioning support information participating in positioning is selected using a receiving time. In this way, a positioning speed can be improved in order to shorten a time consumed in a positioning process.

Finally, a management function that the control device has may further include but is not limited to the following content.

Optionally, the control device may be further configured to periodically broadcast a packet that carries an identifier of a group and an identifier of the control device. The packet is used to enable a positioning terminal that receives the packet and that stores the identifier of the group to store the identifier of the control device. In this way, in a subsequent procedure, the positioning terminal may send information to the control device according to the identifier of the control device.

Optionally, the control device may be further configured to receive a second instruction message sent by the positioning server, and broadcast the second instruction message. The second instruction message carries an identifier of a group, and is used to instruct a positioning terminal in the group to stop executing a positioning packet interaction procedure. The positioning terminal that receives the second instruction message stops executing the positioning packet interaction procedure. For example, generally, after obtaining a position of the to-be-positioned terminal by means of calculation, the positioning server sends the second instruction message to the control device.

The following describes a positioning method provided in an embodiment of the present disclosure. For description of related content in the following positioning method embodiment, refer to the foregoing description. Details are not described herein again.

Figure 4A:
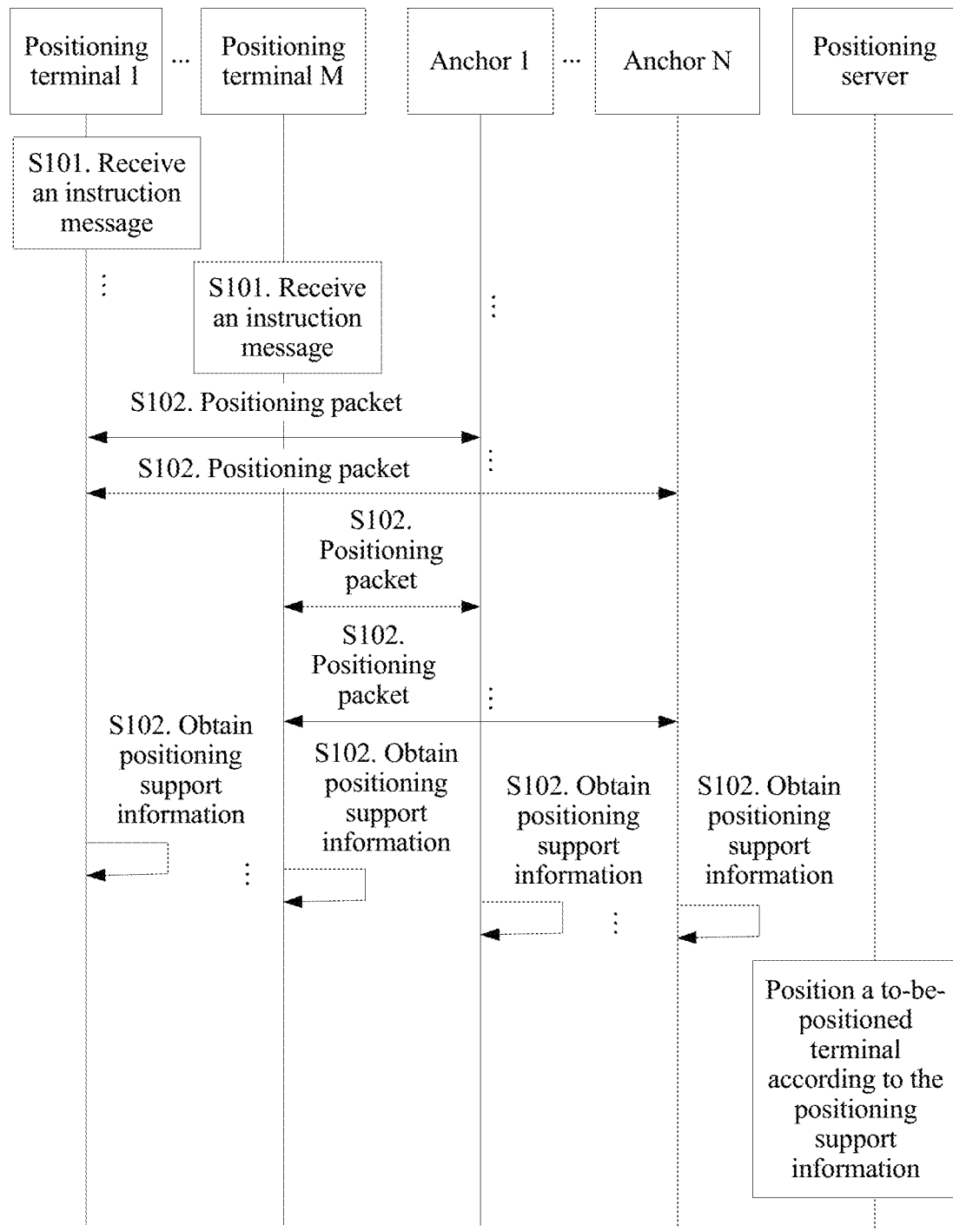
FIG. 4A is a schematic interaction diagram of a positioning method according to an embodiment of the present disclosure.

As shown in FIG. 4A, FIG. 4A is a schematic interaction diagram of a positioning method according to an embodiment of the present disclosure. The method shown in FIG. 4A is used to position a to-be-positioned terminal. The method may include the following steps.

Step S101. At least one positioning terminal receives an instruction message, where a distance between the positioning terminal and the to-be-positioned terminal falls within a preset range.

Step S102. Each of the at least one positioning terminal executes a positioning packet interaction procedure with at least one anchor in a preset anchor set according to the instruction message.

In the interaction procedure, the positioning terminal or the anchor that executes the interaction procedure obtains positioning support information, and the positioning support information is used to enable a positioning server to position the to-be-positioned terminal.

Each positioning terminal may select, according to a communications standard supported by the positioning terminal and a communications standard supported by each anchor, an appropriate communications standard to execute a positioning packet interaction procedure with the anchor. During specific implementation, different positioning terminals may execute positioning packet interaction procedures with different anchors in the preset anchor set.

For example, an example in which the positioning server is independently disposed is used for description in FIG. 4A. During actual implementation, the positioning server may also be disposed together with any device in a positioning system. In addition, an example in which each device participating in an interaction procedure obtains positioning support information is used for description in FIG. 4A. During implementation, a device that obtains positioning support information in an interaction procedure is related to a positioning algorithm used in a positioning system. For related description of the positioning algorithm, refer to the foregoing description.

Figure 4B:
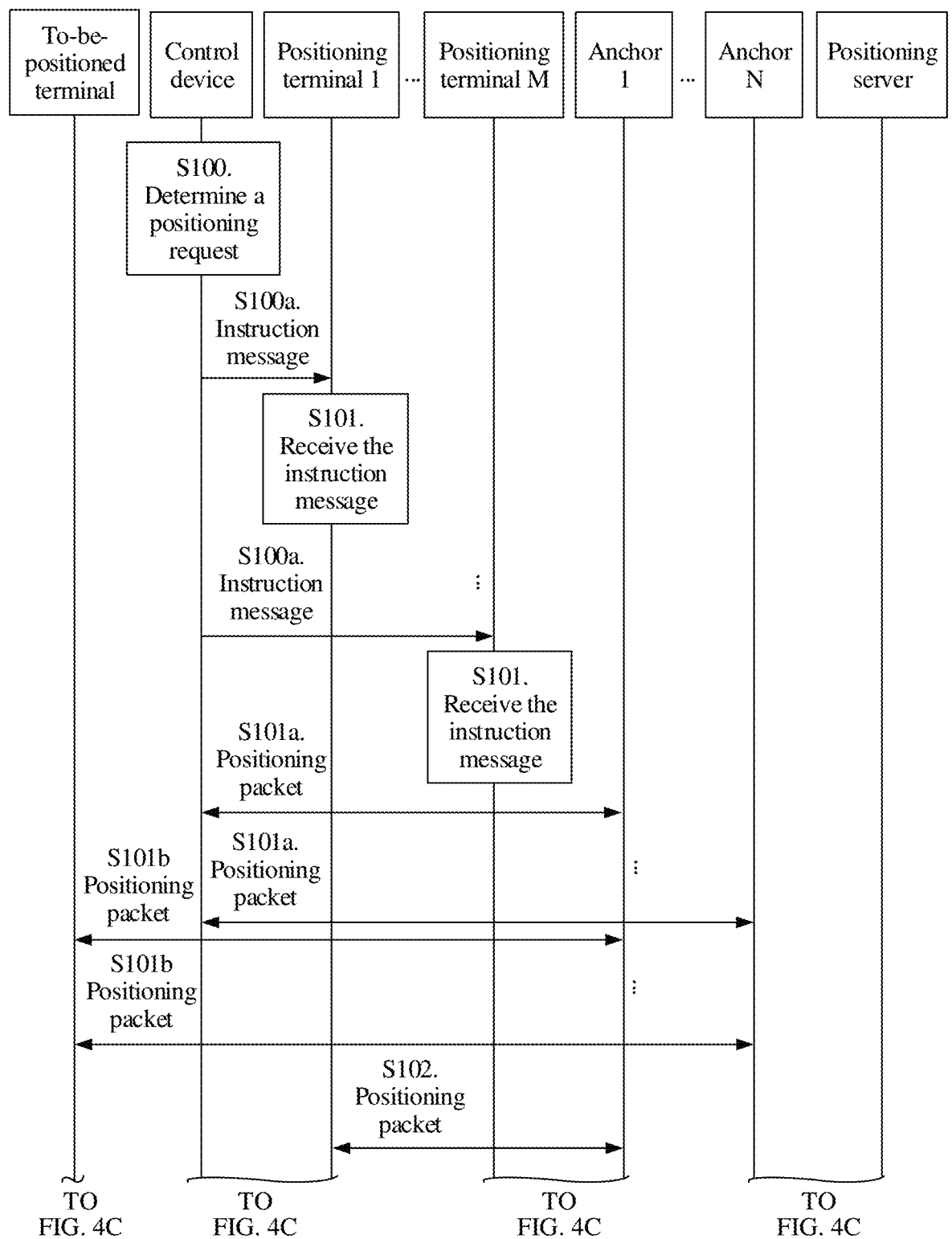
FIG. 4B, FIG. 4C, and FIG. 4D are schematic interaction diagrams of a positioning method according to an embodiment of the present disclosure.
Figure 4C:
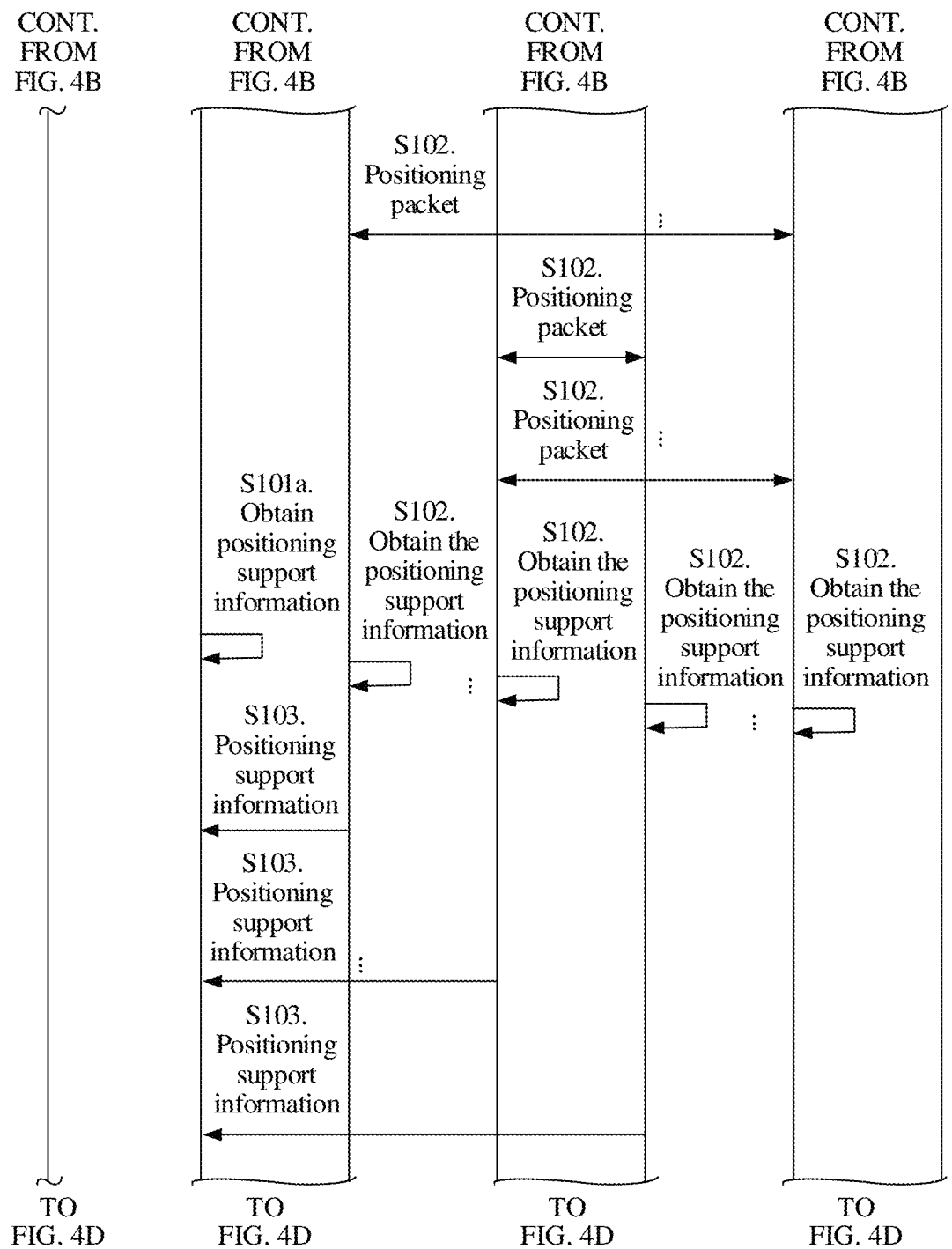
Figure 4D:
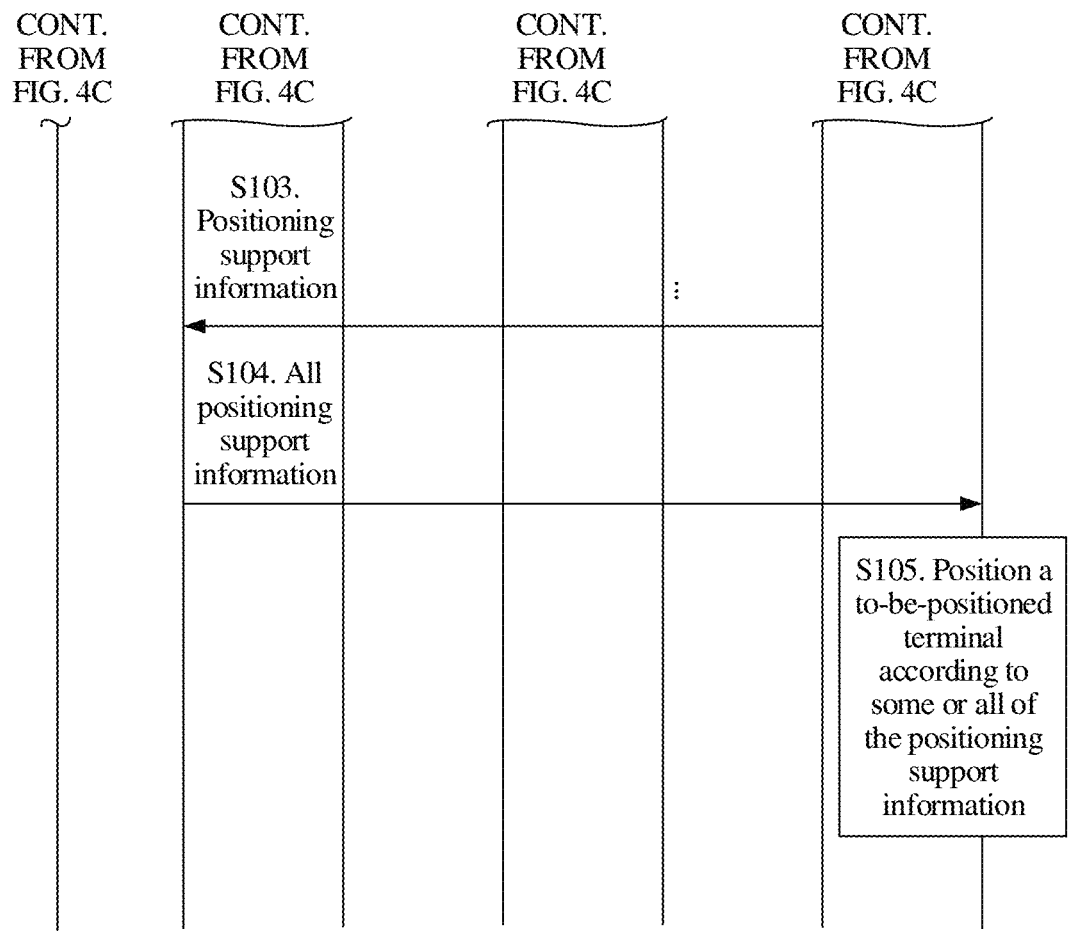

Optionally, as shown in FIG. 4B, FIG. 4C, and FIG. 4D, before step S101, the method may further include the following steps.

Step S100. A control device determines a positioning request for positioning the to-be-positioned terminal.

Step S100a. The control device sends the instruction message to the at least one positioning terminal.

Further, the control device broadcasts the instruction message. Optionally, the instruction message may carry an identifier of a group in which the to-be-positioned terminal is located.

Optionally, as shown in FIG. FIG. 4B, FIG. 4C, and FIG. 4D, after step S101, the method may further include the following steps.

Step S101a. The control device executes a positioning packet interaction procedure with the at least one anchor in the preset anchor set such that the positioning terminal or the anchor in the interaction procedure obtains positioning support information.

A sequence of performing steps S101 and S102, and step S101a is not limited in this embodiment of the present disclosure. For example, steps S101 and S102 may be first performed before step S101a is performed, step S101a may be first performed before steps S101 and S102 are performed, or steps S101 and S102, and step S101a may be performed at the same time.

In the optional implementation, optionally, a distance between the control device and the to-be-positioned terminal falls within the preset range. That is, in this case, the control device has a function of the positioning terminal, and has a management function. For description of the management function, refer to another part in this specification. Details are not described herein again.

Step S101b. The to-be-positioned terminal executes a positioning packet interaction procedure with the at least one anchor in the preset anchor set such that the positioning terminal or the anchor in the interaction procedure obtains the positioning support information.

Further, the to-be-positioned terminal may start to execute the positioning packet interaction procedure with the at least one anchor in the preset anchor set according to a trigger mechanism provided in the other approaches, or may start to execute the positioning packet interaction procedure with the at least one anchor in the preset anchor set after receiving the instruction message sent by the control device.

A sequence of performing steps S101 and S102, and step S101b is not limited in this embodiment of the present disclosure. A sequence of performing steps S101a and S101b is not limited either.

Optionally, as shown in FIG. 4B, FIG. 4C, and FIG. 4D, after step S102, the method may further include the following steps.

Step S103. Each device that obtains positioning support information sends the positioning support information to the control device.

Step S104. The control device receives the positioning support information, and sends the positioning support information to a positioning server.

For example, in the optional implementation, the device that obtains the positioning support information is a device other than the control device, for example, the positioning terminal, the anchor, or the to-be-positioned terminal. If the control device is the device that obtains the positioning support information, step S104 may further include that the control device receives positioning support information sent by a positioning support device, and sends the positioning support information and the positioning support information obtained by the control device to the positioning server.

Step S105. The positioning server positions the to-be-positioned terminal according to the positioning support information.

For example, the positioning server positions the to-be-positioned terminal according to positioning support information that is in at least one piece of positioning support information and that is received within a preset time period. Alternatively, the positioning server positions the to-be-positioned terminal according to a preset amount of positioning support information with a high receiving time priority in at least one piece of positioning support information. An earlier receiving time leads to a higher receiving time priority. In this way, a positioning speed can be improved in order to shorten a time consumed in a positioning process.

In the optional implementation, each device that obtains positioning support information first sends the positioning support information obtained by the device to the control device, and then the control device sends the positioning support information to the positioning server. During actual implementation, each device that obtains positioning support information may directly send the positioning support information obtained by the device to the positioning server.

Optionally, the method may further include the following steps.

Step S1: The device that obtains the positioning support information obtains at least one piece of the following information including identifiers of two interaction parties in the interaction procedure or a quality factor of the positioning support information, where the quality factor of the positioning support information is used to represent quality of the positioning support information.

A specific implementation of obtaining any one of the at least one piece of information by the device that obtains the positioning support information is not limited in this embodiment of the present disclosure. For example, the device that obtains the positioning support information obtains the identifiers of two interaction parties in the interaction procedure in a process in which the device executes the positioning packet interaction procedure with the at least one anchor in the preset anchor set. For example, the device that obtains the positioning support information obtains the quality factor of the positioning support information according to at least one piece of the following information including whether a transmission channel of a positioning packet is a LOS channel, a signal-to-noise ratio of a positioning packet, a wireless signal bandwidth used during positioning packet transmission, an ADC sampling rate that is of a receiver and used during positioning packet transmission, or stability of the positioning support information obtained for multiple times within a preset time period.

Step S2: The device that obtains the positioning support information sends the at least one piece of information to the control device.

For example, the device that obtains the positioning support information may send the at least one piece of information to the control device when sending the positioning support information to the control device.

Step S3: The control device sends the at least one piece of information to the positioning server.

In the optional implementation, the device that obtains the positioning support information is a device other than the control device, for example, the positioning terminal, the anchor, or the to-be-positioned terminal. During actual implementation, the device may be the control device. In this case, the control device may directly obtain the at least one piece of information, and sends the obtained at least one piece of information to the positioning server.

Based on the optional implementation, step S105 may include that the positioning server receives the at least one piece of information, and positions the to-be-positioned terminal according to positioning support information whose quality factor meets a preset condition. For a specific implementation process of the optional implementation, refer to the foregoing system embodiment. Details are not described herein again.

For beneficial effects that can be achieved by any positioning method provided in the embodiments of present disclosure, refer to a corresponding part in the system embodiment described above. Details are not described herein again.

The following describes an apparatus corresponding to the positioning method and that is provided in an embodiment of the present disclosure. For description of related content in the following apparatus embodiments, refer to the foregoing description. Details are not described herein again.

Figure 5:
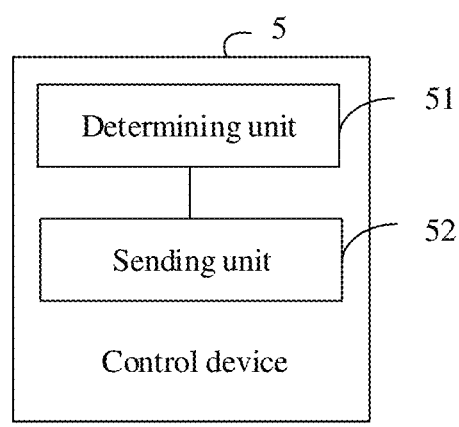
FIG. 5 is a schematic structural diagram of a control device according to an embodiment of the present disclosure.

As shown in FIG. 5, FIG. 5 is a schematic structural diagram of a control device 5 according to an embodiment of the present disclosure. A control device 5 shown in FIG. 5 is configured to perform an action performed by the control device in any embodiment provided above. The control device 5 is configured to position a to-be-positioned terminal. The control device 5 may include modules corresponding to the corresponding steps, for example, may include a determining unit 51 and a sending unit 52.

The determining unit 51 is configured to determine a positioning request for positioning the to-be-positioned terminal.

The sending unit 52 is configured to send an instruction message to at least one positioning terminal according to the positioning request.

A distance between the positioning terminal and the to-be-positioned terminal falls within a preset range. The instruction message is used to instruct the positioning terminal to execute a positioning packet interaction procedure with at least one anchor in a preset anchor set. The interaction procedure is used to enable the positioning terminal or the anchor that executes the interaction procedure to obtain positioning support information, and the positioning support information is used to enable a positioning server to position the to-be-positioned terminal.

Figure 6:
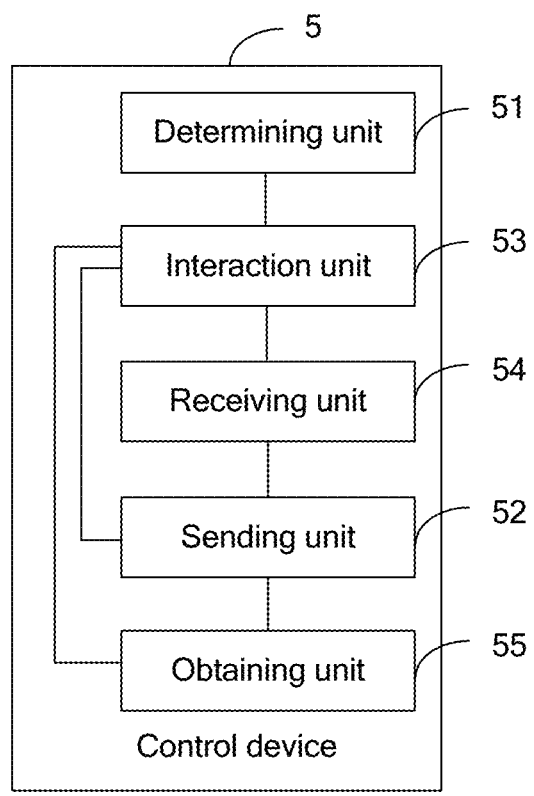
FIG. 6 is a schematic structural diagram of another control device according to an embodiment of the present disclosure.

Optionally, as shown in FIG. 6, the control device 5 may further include an interaction unit 53 configured to execute a positioning packet interaction procedure with the at least one anchor in the preset anchor set.

Optionally, as shown in FIG. 6, the control device 5 may further include a receiving unit 54 configured to receive positioning support information sent by a device that obtains the positioning support information. In this case, the sending unit 52 may be further configured to send the positioning support information to the positioning server.

Optionally, as shown in FIG. 6, the control device 5 may further include an obtaining unit 55 configured to obtain at least one piece of the following information including identifiers of two interaction parties in the interaction procedure or a quality factor of the positioning support information, where the quality factor of the positioning support information is used to represent quality of the positioning support information. In this case, the sending unit 52 may be further configured to send the at least one piece of information to the positioning server. The at least one piece of information is used to enable the positioning server to position the to-be-positioned terminal.

Optionally, as shown in FIG. 6, the control device 5 may further include the receiving unit 54 configured to receive at least one piece of the following information sent by the device that obtains the positioning support information including the identifiers of two interaction parties in the interaction procedure or the quality factor of the positioning support information, where the quality factor of the positioning support information is used to represent the quality of the positioning support information. In this case, the sending unit 52 may be further configured to send the received at least one piece of information to the positioning server. The at least one piece of information is used to enable the positioning server to position the to-be-positioned terminal.

Optionally, the at least one piece of information includes the quality factor of the positioning support information. The obtaining unit 55 may be further configured to obtain the quality factor of the positioning support information according to at least one piece of the following information including whether a transmission channel of a positioning packet is a LOS channel, a signal-to-noise ratio of a positioning packet, a wireless signal bandwidth used during positioning packet transmission, an ADC sampling rate that is of a receiver and used during positioning packet transmission, or stability of the positioning support information obtained for multiple times within a preset time period.

It should be noted that for distinguishing, in the foregoing embodiment, a module, in the control device 5, that exchanges information with the anchor is referred to as the interaction unit 53, modules, in the control device 5, that exchange information with the positioning terminal are referred to as the sending unit 52 and the receiving unit 54.

It may be understood that the control device 5 provided in this embodiment of the present disclosure may be corresponding to the control device in the foregoing method embodiments, and division and/or functions of the modules in the control device 5 provided in this embodiment of the present disclosure are used to implement the foregoing method procedures. For brevity, the method procedures are not described herein again.

The control device 5 in this embodiment of the present disclosure may be configured to perform the foregoing method procedures. Therefore, for technical effects that can be achieved by the control device 5, refer to the foregoing method embodiments. Details are not described again in this embodiment of the present disclosure.

In terms of hardware implementation, the interaction unit 53, the sending unit 52, and the receiving unit 54 each may be referred to as a transceiver (or a transceiver machine, a transceiver antenna, or the like). The determining unit 51 and the obtaining unit 55 may be built in or independent of a processor of the control device 5 in a hardware form, or may be stored in a memory of the control device 5 in a software form such that the processor invokes and performs operations corresponding to the foregoing modules.

Figure 7:
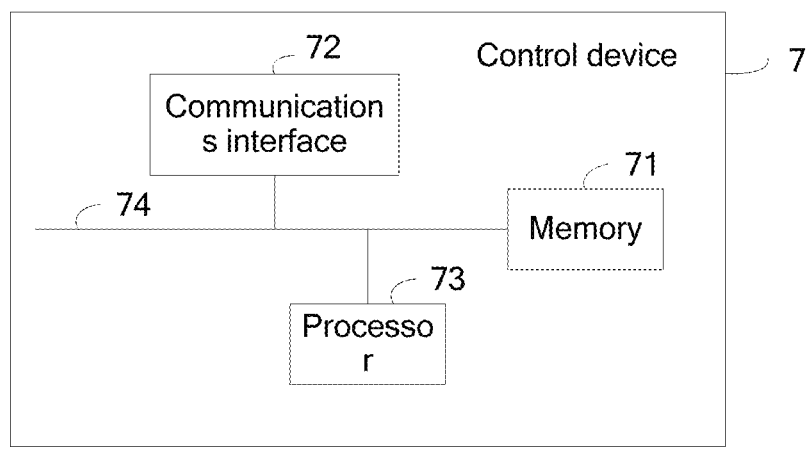
FIG. 7 is a schematic structural diagram of another control device according to an embodiment of the present disclosure.

As shown in FIG. 7, FIG. 7 is a schematic structural diagram of a control device 7 according to an embodiment of the present disclosure. The control device 7 shown in FIG. 7 is configured to perform an action performed by the control device in any embodiment provided above. For description of related content in this embodiment, refer to the foregoing description. Details are not described herein again. The control device 7 is configured to position a to-be-positioned terminal. The control device 7 may include a memory 71, a communications interface 72, a processor 73, and a system bus 74. The memory 71, the communications interface 72 and the processor 73 are connected using the system bus 74.

The memory 71 is configured to store a computer executable instruction. When the control device 7 runs, the processor 73 executes the computer executable instruction stored in the memory 71 such that the control device 7 performs the action of the control device in any embodiment described above. Further, for the action performed by the control device 7, refer to the foregoing related description. Details are not described herein again.

This embodiment further provides a storage medium, and the storage medium may include the memory 71.

In a specific implementation process, steps performed by the control device in any embodiment described above may be implemented in a manner in which the processor 73 in a hardware form executes the computer executable instruction in a software form that is stored in the memory 71. To avoid repetition, details are not described herein again.

The control device 7 in this embodiment of the present disclosure may be configured to perform the foregoing method procedures. Therefore, for technical effects that can be achieved by the control device 7, refer to the foregoing method embodiments. Details are not described again in this embodiment of the present disclosure.

Figure 8:
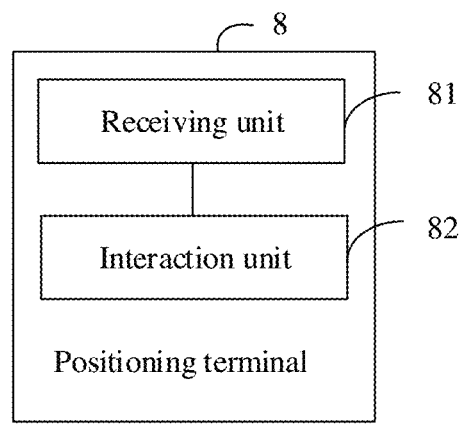
FIG. 8 is a schematic structural diagram of a positioning terminal according to an embodiment of the present disclosure.

As shown in FIG. 8, FIG. 8 is a schematic structural diagram of a positioning terminal 8 according to an embodiment of the present disclosure. The positioning terminal 8 shown in FIG. 8 is configured to perform an action performed by the positioning terminal in any embodiment provided above. The positioning terminal 8 is configured to position a to-be-positioned terminal. A distance between the positioning terminal 8 and the to-be-positioned terminal falls within a preset range. The positioning terminal 8 may include modules corresponding to the corresponding steps, for example, may include a receiving unit 81 and an interaction unit 82.

The receiving unit 81 is configured to receive an instruction message.

The interaction unit 82 is configured to execute a positioning packet interaction procedure with at least one anchor in a preset anchor set according to the instruction message.

The interaction procedure is used to enable the positioning terminal 8 or the anchor that executes the interaction procedure to obtain positioning support information, and the positioning support information is used to enable a positioning server to position the to-be-positioned terminal.

Optionally, the receiving unit 81 may be further configured to receive an instruction message sent by a control device.

Figure 9:
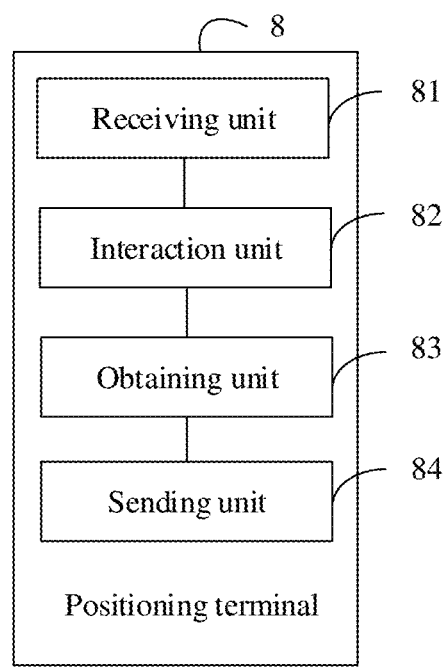
FIG. 9 is a schematic structural diagram of another positioning terminal according to an embodiment of the present disclosure.

Optionally, as shown in FIG. 9, the positioning terminal 8 may further include an obtaining unit 83 and a sending unit 84. The obtaining unit 83 is configured to obtain the positioning support information in a process in which the interaction unit 82 executes the positioning packet interaction procedure with the at least one anchor in the preset anchor set. The sending unit 84 is configured to send the positioning support information to the positioning server using the control device.

Optionally, as shown in FIG. 9, the positioning terminal 8 may further include an obtaining unit 83 and a sending unit 84. The obtaining unit 83 is configured to obtain at least one piece of the following information including identifiers of two interaction parties in the interaction procedure or a quality factor of the positioning support information. The quality factor of the positioning support information is used to represent quality of the positioning support information. The sending unit 84 is configured to send the at least one piece of information to the positioning server using the control device. The at least one piece of information is used to enable the positioning server to position the to-be-positioned terminal.

Optionally, the at least one piece of information includes the quality factor of the positioning support information. The obtaining unit 83 may be further configured to obtain the quality factor of the positioning support information according to at least one piece of the following information including whether a transmission channel of a positioning packet is a LOS channel, a signal-to-noise ratio of a positioning packet, a wireless signal bandwidth used during positioning packet transmission, an ADC sampling rate that is of a receiver and used during positioning packet transmission, or stability of the positioning support information obtained for multiple times within a preset time period.

It may be understood that the positioning terminal 8 provided in this embodiment of the present disclosure may be corresponding to the positioning terminal in the foregoing method embodiments, and division and/or functions of the modules in the positioning terminal 8 provided in this embodiment of the present disclosure are used to implement the foregoing method procedures. For brevity, the method procedures are not described herein again.

The positioning terminal 8 in this embodiment of the present disclosure may be configured to perform the foregoing method procedures. Therefore, for technical effects that can be achieved by the positioning terminal 8, refer to the foregoing method embodiments. Details are not described again in this embodiment of the present disclosure.

In terms of hardware implementation, the receiving unit 81, the interaction unit 82, and the sending unit 84 each may be referred to as a transceiver (or a transceiver machine, a transceiver antenna, or the like). The obtaining unit 83 may be built in or independent of a processor of the positioning terminal 8 in a hardware form, or may be stored in a memory of the positioning terminal 8 in a software form such that the processor invokes and performs operations corresponding to the foregoing modules.

Figure 10:
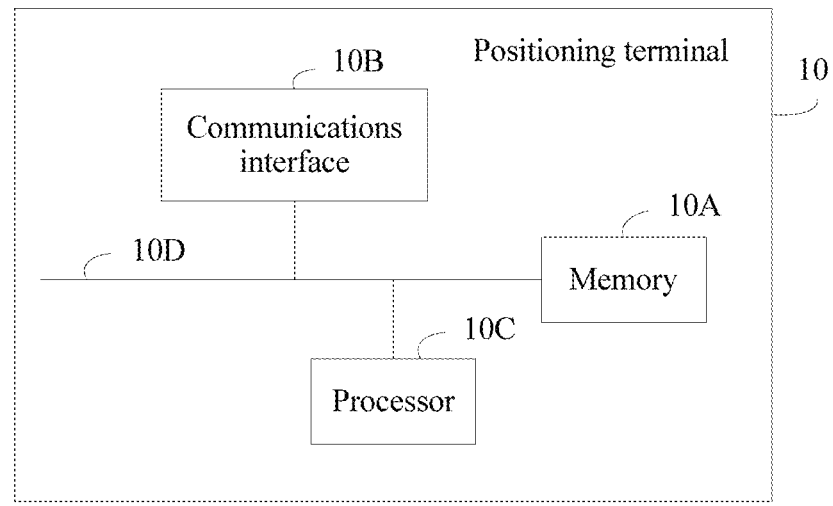
FIG. 10 is a schematic structural diagram of another positioning terminal according to an embodiment of the present disclosure.

As shown in FIG. 10, FIG. 10 is a schematic structural diagram of a positioning terminal 10 according to an embodiment of the present disclosure. The positioning terminal 10 shown in FIG. 10 is configured to perform an action performed by the positioning terminal in any embodiment provided above. For description of related content in this embodiment, refer to the foregoing description. Details are not described herein again. The positioning terminal 10 is configured to position a to-be-positioned terminal. A distance between the positioning terminal 10 and the to-be-positioned terminal falls within a preset range. The positioning terminal 10 may include a memory 10A, a communications interface 10B, a processor 10C, and a system bus 10D. The memory 10A, the communications interface 10B and the processor 10C are connected using the system bus 10D.

The memory 10A is configured to store a computer executable instruction. When the positioning terminal 10 runs, the processor 10C executes the computer executable instruction stored in the memory 10A such that the positioning terminal 10 performs the action of the positioning terminal in any embodiment described above. Further, for the action performed by the positioning terminal 10, refer to the foregoing related description. Details are not described herein again.

This embodiment further provides a storage medium, and the storage medium may include the memory 10A.

In a specific implementation process, steps performed by the positioning terminal in any embodiment described above may be implemented in a manner in which the processor 10C in a hardware form executes the computer executable instruction in a software form that is stored in the memory 10A. To avoid repetition, details are not described herein again.

The positioning terminal 10 in this embodiment of the present disclosure may be configured to perform the foregoing method procedures. Therefore, for technical effects that can be achieved by the positioning terminal 10, refer to the foregoing method embodiments. Details are not described again in this embodiment of the present disclosure.

Figure 11:
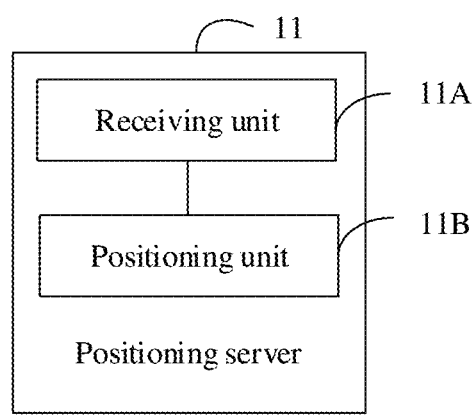
FIG. 11 is a schematic structural diagram of a positioning server according to an embodiment of the present disclosure.

As shown in FIG. 11, FIG. 11 is a schematic structural diagram of a positioning server 11 according to an embodiment of the present disclosure. The positioning server 11 shown in FIG. 11 is configured to perform an action performed by the positioning server in any embodiment provided above. The positioning server 11 is configured to position a to-be-positioned terminal. The positioning server 11 may include modules corresponding to the corresponding steps, for example, may include a receiving unit 11A and a positioning unit 11B.

The receiving unit 11A is configured to receive at least one piece of positioning support information. The positioning support information is positioning support information obtained in a process in which at least one positioning terminal executes a positioning packet interaction procedure with at least one anchor in a preset anchor set, and a distance between the positioning terminal and the to-be-positioned terminal falls within a preset range.

The positioning unit 11B is configured to position the to-be-positioned terminal according to the at least one piece of positioning support information.

Optionally, the receiving unit 11A may be further configured to receive at least one piece of positioning support information sent by a control device.

Optionally, a distance between the control device and the to-be-positioned terminal falls within the preset range, and the at least one piece of positioning support information may further include positioning support information obtained in a process in which the control device executes a positioning packet interaction procedure with the at least one anchor in the preset anchor set.

Optionally, the at least one piece of positioning support information may further include positioning support information obtained in a process in which the to-be-positioned terminal executes a positioning packet interaction procedure with the at least one anchor in the preset anchor set.

Optionally, the receiving unit 11A may be further configured to receive a quality factor of positioning support information in the at least one piece of positioning support information. The positioning unit 11B may be further configured to position the to-be-positioned terminal according to positioning support information that is in the at least one piece of positioning support information and whose quality factor meets a preset condition.

Optionally, the positioning unit 11B may be further configured to position the to-be-positioned terminal according to positioning support information that is in the at least one piece of positioning support information and that is received within a preset time period, or position the to-be-positioned terminal according to a preset amount of positioning support information with a high receiving time priority in the at least one piece of positioning support information. An earlier receiving time leads to a higher receiving time priority.

It may be understood that the positioning server 11 provided in this embodiment of the present disclosure may be corresponding to the positioning server in the foregoing method embodiments, and division and/or functions of the modules in the positioning server 11 provided in this embodiment of the present disclosure are used to implement the foregoing method procedures. For brevity, the method procedures are not described herein again.

The positioning server 11 in this embodiment of the present disclosure may be configured to perform the foregoing method procedures. Therefore, for technical effects that can be achieved by the positioning server 11, refer to the foregoing method embodiments. Details are not described again in this embodiment of the present disclosure.

In terms of hardware implementation, the receiving unit 11A may be referred to as a transceiver (or a transceiver machine, a transceiver antenna, or the like). The positioning unit 11B may be built in or independent of a processor of the positioning server 11 in a hardware form, or may be stored in a memory of the positioning server 11 in a software form such that the processor invokes and performs operations corresponding to the foregoing modules.

Figure 12:
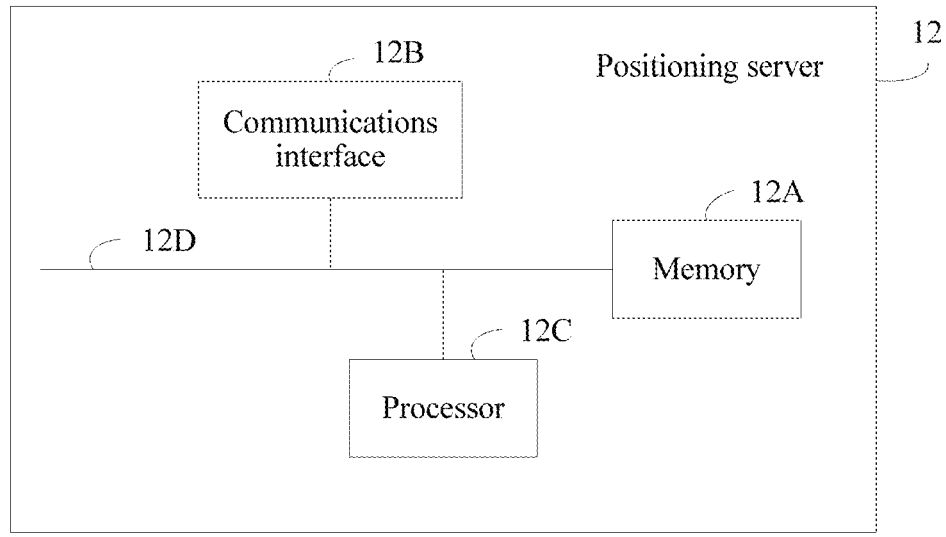
FIG. 12 is a schematic structural diagram of another positioning server according to an embodiment of the present disclosure.

As shown in FIG. 12, FIG. 12 is a schematic structural diagram of a positioning server 12 according to an embodiment of the present disclosure. The positioning server 12 shown in FIG. 12 is configured to perform an action performed by the positioning server in any embodiment provided above. For description of related content in this embodiment, refer to the foregoing description. Details are not described herein again. The positioning server 12 may include a memory 12A, a communications interface 12B, a processor 12C, and a system bus 12D. The memory 12A, the communications interface 12B and the processor 12C are connected using the system bus 12D.

The memory 12A is configured to store a computer executable instruction. When the positioning server 12 runs, the processor 12C executes the computer executable instruction stored in the memory 12A such that the positioning server 12 performs the action of the positioning server in any embodiment described above. Further, for the action performed by the positioning server, refer to the foregoing related description. Details are not described herein again.

This embodiment further provides a storage medium, and the storage medium may include the memory 12A.

In a specific implementation process, steps performed by the positioning server in any embodiment described above may be implemented in a manner in which the processor 12C in a hardware form executes the computer executable instruction in a software form that is stored in the memory 12A. To avoid repetition, details are not described herein again.

The positioning server 12 in this embodiment of the present disclosure may be configured to perform the foregoing method procedures. Therefore, for technical effects that can be achieved by the positioning server 12, refer to the foregoing method embodiments. Details are not described again in this embodiment of the present disclosure.

Figure 13:
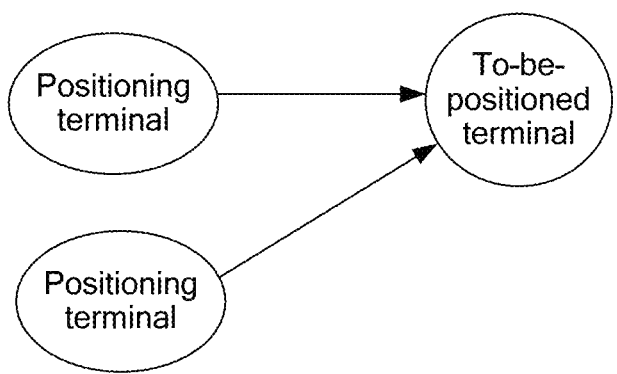
FIG. 13 is a schematic architectural diagram of another positioning system according to an embodiment of the present disclosure.

An embodiment of the present disclosure further provides another positioning system. As shown in FIG. 13, the system is used to position a to-be-positioned terminal, and includes the to-be-positioned terminal and at least one positioning terminal, and a distance between the at least one positioning terminal and the to-be-positioned terminal falls within a preset range. An example in which the at least one positioning terminal includes two positioning terminals is used for description in FIG. 13. The positioning terminal is configured to receive an instruction message, and execute a positioning packet interaction procedure with at least one anchor in a preset anchor set according to the instruction message. The interaction procedure is used to enable the positioning terminal or the anchor that executes the interaction procedure to obtain positioning support information, and the positioning support information is used to enable a positioning server to position the to-be-positioned terminal to obtain position information of the positioning terminal and send the position information to the positioning terminal. The to-be-positioned terminal is configured to receive the position information of the at least one positioning terminal, and position the to-be-positioned terminal according to the position information of the positioning terminal.

For description of related content in this embodiment, refer to the foregoing description. Details are not described herein again.

It should be noted that, different from the instruction message provided above, the instruction message in this embodiment may be used to instruct the positioning terminal to execute the positioning packet interaction procedure with the at least one anchor in the preset anchor set, and optionally, may be further used to instruct the positioning terminal to send the position information to the to-be-positioned terminal after receiving the position information of the positioning terminal that is sent by the positioning server. In addition, in this embodiment, for a specific implementation of obtaining the position information of the positioning terminal by the positioning server, refer to the other approaches.

During specific implementation, optionally, the to-be-positioned terminal may be further configured to set position information of one of the at least one positioning terminal as position information of the to-be-positioned terminal. Alternatively, the position information of the at least one positioning terminal may be calculated to obtain position information of the to-be-positioned terminal. Certainly, this does not constitute a limitation during specific implementation.

Optionally, the to-be-positioned terminal is further configured to receive a quality factor of the position information of the at least one positioning terminal. The quality factor of the position information is used to represent quality of the position information. The to-be-positioned terminal is further configured to position the to-be-positioned terminal according to position information whose quality factor meets a preset condition.

For example, in the optional implementation, the to-be-positioned terminal may be further configured to receive the quality factor that is of the position information of the at least one positioning terminal and that is sent by the at least one positioning terminal or the positioning server.

Based on the optional implementation, further, optionally, the positioning terminal may be further configured to send the quality factor of the position information to the to-bepositioned terminal after sending the position information of the positioning terminal to the to-be-positioned terminal, or add the position information of the positioning terminal and the quality factor of the position information into a same message to send the message to the to-be-positioned terminal. Further, optionally, the system may further include the positioning server configured to obtain the quality factor of the position information of the positioning terminal, and send the quality factor to the positioning terminal.

A specific implementation, an obtaining manner, an obtaining moment, and the like of obtaining the quality factor of the position information by the positioning terminal or the positioning server are not limited in this embodiment of the present disclosure. For example, during specific implementation, the positioning server may determine the quality factor of the position information according to a quality factor that is of positioning support information and that is used in a process of obtaining the position information of the positioning terminal.

In the positioning system provided in this embodiment, the to-be-positioned terminal is positioned using positioning packet information obtained after the at least one positioning terminal whose distance from the to-be-positioned terminal falls within the preset range executes the positioning packet interaction procedure with the at least one anchor in the preset anchor set. The to-be-positioned terminal is positioned using the position information of the at least one positioning terminal. That is, the to-be-positioned terminal is positioned indirectly using the positioning packet information obtained after the at least one positioning terminal whose distance from the to-be-positioned terminal falls within the preset range executes the positioning packet interaction procedure with the at least one anchor in the preset anchor set. Therefore, for the to-be-positioned terminal, quality of the obtained positioning support information can be improved (for a specific analysis process, refer to the foregoing description) in order to improve quality of the position information, and improve precision of a positioning result.

Figure 14:
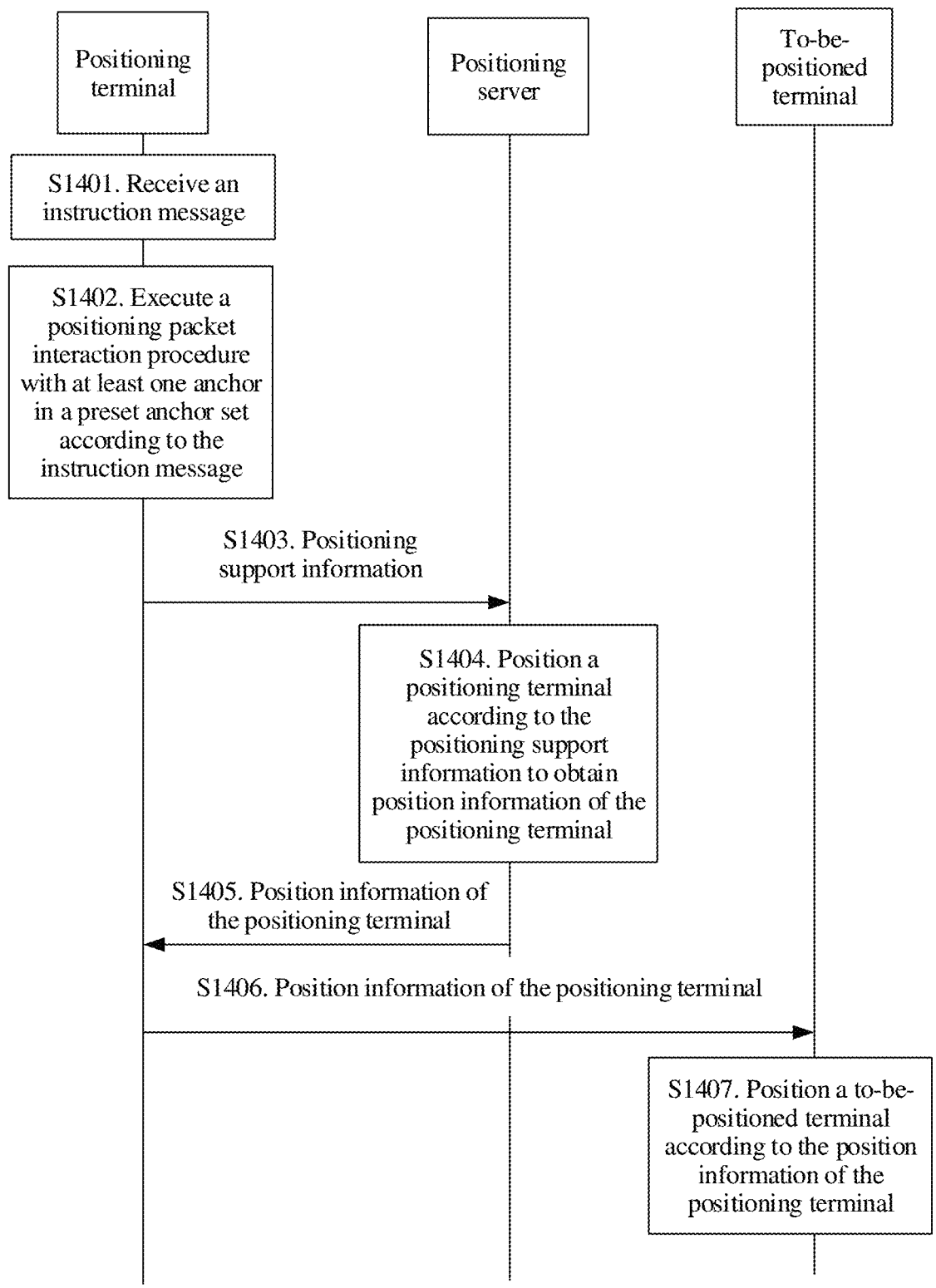
FIG. 14 is a schematic interaction diagram of another positioning method according to an embodiment of the present disclosure.

As shown in FIG. 14, FIG. 14 is a schematic interaction diagram of another positioning method according to an embodiment of the present disclosure. The method shown in FIG. 14 is used to position a to-be-positioned terminal. The method may include the following steps.

Step S1401. A positioning terminal receives an instruction message.

Step S1402. The positioning terminal executes a positioning packet interaction procedure with at least one anchor in a preset anchor set according to the instruction message, where a distance between the positioning terminal and the to-be-positioned terminal falls within a preset range, and the interaction procedure is used to enable the positioning terminal or the anchor that executes the interaction procedure to obtain positioning support information.

Step S1403. A device that obtains positioning support information sends the positioning support information to a positioning server.

For example, the device that obtains the positioning support information is the positioning terminal or the anchor that executes the interaction procedure. An example in which the device that obtains the positioning support information is a positioning device is used for description in FIG. 14.

Step S1404. The positioning server positions the positioning terminal according to the positioning support information to obtain position information of the positioning terminal.

Step S1405. The positioning server sends the position information of the positioning terminal to the positioning terminal.

Step S1406. The positioning terminal receives the position information of the positioning terminal that is sent by the positioning server, and sends the position information to the to-be-positioned terminal.

Step S1407. The to-be-positioned terminal receives the position information, and positions the to-be-positioned terminal according to the position information of the positioning terminal.

During specific implementation, steps S1401 to S1406 may be performed simultaneously or sequentially between the positioning server and multiple positioning terminals whose distances from the to-be-positioned terminal fall within the preset range. In this case, in step S1407, the to-be-positioned terminal may position the to-be-positioned terminal according to position information of the multiple positioning terminals.

Optionally, the method may further include receiving, by the to-be-positioned terminal, a quality factor of position information of at least one positioning terminal. The quality factor of the position information is used to represent quality of the position information. In this case, that the to-be-positioned terminal positions the to-be-positioned terminal according to the position information of the at least one positioning terminal may include positioning, by the to-be-positioned terminal, the to-be-positioned terminal according to position information that is in the position information of the at least one positioning terminal and whose quality factor meets a preset condition.

For beneficial effects that can be achieved by this embodiment, refer to the beneficial effects that can be achieved by the system shown in FIG. 13. Details are not described herein again.

Figure 15:
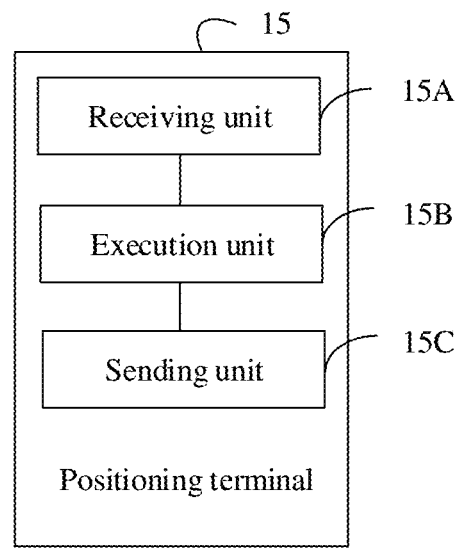
FIG. 15 is a schematic structural diagram of another positioning terminal according to an embodiment of the present disclosure.

As shown in FIG. 15, FIG. 15 is a schematic structural diagram of a positioning terminal 15 according to an embodiment of the present disclosure. The positioning terminal 15 shown in FIG. 15 is configured to perform an action performed by the positioning terminal in FIG. 14. For description of related content in this embodiment, refer to the foregoing description. Details are not described herein again. The positioning terminal 15 is configured to position a to-be-positioned terminal.

The positioning terminal 15 may include modules corresponding to the corresponding steps, for example, may include a receiving unit 15A, an execution unit 15B, and a sending unit 15C.

The receiving unit 15A is configured to receive an instruction message.

The execution unit 15B is configured to execute a positioning packet interaction procedure with at least one anchor in a preset anchor set according to the instruction message. A distance between the positioning terminal 15 and the to-be-positioned terminal falls within a preset range, the interaction procedure is used to enable the positioning terminal 15 or the anchor that executes the interaction procedure to obtain positioning support information, and the positioning support information is used to enable a positioning server to position the to-be-positioned terminal to obtain position information of the positioning terminal.

The receiving unit 15A is further configured to receive the position information of the positioning terminal 15 that is sent by the positioning server.

The sending unit 15C is configured to send the position information of the positioning terminal 15 to the to-be-positioned terminal such that the to-be-positioned terminal positions the to-be-positioned terminal according to the position information of the positioning terminal 15.

In terms of hardware implementation, the receiving unit 15A and the sending unit 15C each may be referred to as a transceiver (or a transceiver machine, a transceiver antenna, or the like). The execution unit 15B may be built in or independent of a processor of the positioning terminal 15 in a hardware form, or may be stored in a memory of the positioning terminal 15 in a software form such that the processor invokes and performs operations corresponding to the foregoing modules.

Figure 16:
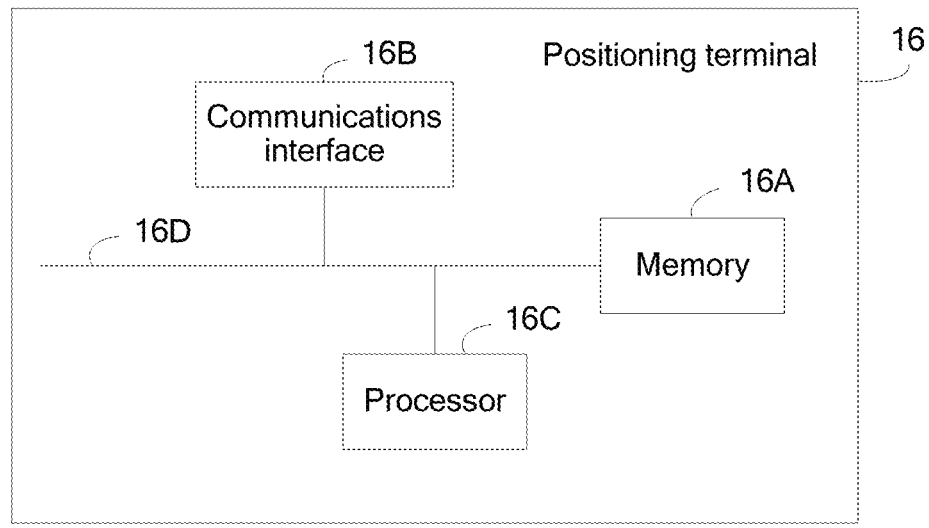
FIG. 16 is a schematic structural diagram of another positioning terminal according to an embodiment of the present disclosure.

As shown in FIG. 16, FIG. 16 is a schematic structural diagram of a positioning terminal 16 according to an embodiment of the present disclosure. The positioning terminal 16 shown in FIG. 16 is configured to perform an action performed by the positioning terminal in FIG. 14. For description of related content in this embodiment, refer to the foregoing description. Details are not described herein again. The positioning terminal 16 may include a memory 16A, a communications interface 16B, a processor 16C, and a system bus 16D. The memory 16A, the communications interface 16B and the processor 16C are connected using the system bus 16D.

The memory 16A is configured to store a computer executable instruction. When the positioning terminal 16 runs, the processor 16C executes the computer executable instruction stored in the memory 16A such that the positioning terminal 16 performs the action of the positioning terminal in any embodiment described above. Further, for the action performed by the positioning terminal, refer to the foregoing related description. Details are not described herein again.

This embodiment further provides a storage medium, and the storage medium may include the memory 16A.

In a specific implementation process, steps performed by the positioning terminal in FIG. 14 may be implemented in a manner in which the processor 16C in a hardware form executes the computer executable instruction in a software form that is stored in the memory 16A. To avoid repetition, details are not described herein again.

For beneficial effects that can be achieved by the positioning terminal 15 and the positioning terminal 16 in the embodiments, refer to the beneficial effects that can be achieved by the system shown in FIG. 13. Details are not described herein again.

Figure 17:
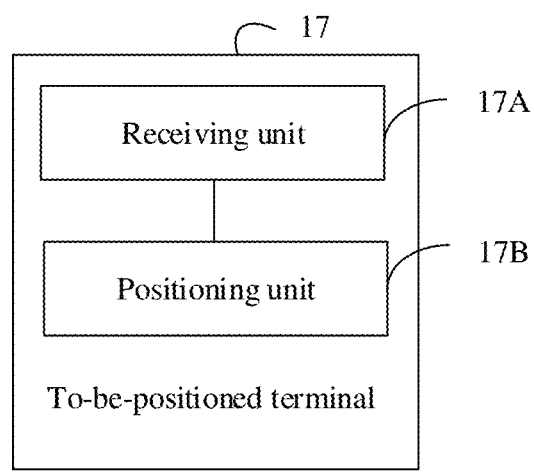
FIG. 17 is a schematic structural diagram of a to-be-positioned terminal according to an embodiment of the present disclosure.

As shown in FIG. 17, FIG. 17 is a schematic structural diagram of a to-be-positioned terminal 17 according to an embodiment of the present disclosure. The to-be-positioned terminal 17 shown in FIG. 17 is configured to perform an action performed by the to-be-positioned terminal in FIG. 14. For description of related content in this embodiment, refer to the foregoing description. Details are not described herein again. The to-be-positioned terminal 17 is configured to position the to-be-positioned terminal 17. The to-be-positioned terminal 17 may include modules corresponding to the corresponding steps, for example, may include a receiving unit 17A and a positioning unit 17B.

The receiving unit 17A is configured to receive position information of at least one positioning terminal that is sent by the at least one positioning terminal. A distance between the at least one positioning terminal and the to-be-positioned terminal 17 falls within a preset range.

The positioning unit 17B is configured to position the to-be-positioned terminal 17 according to position information of a positioning terminal of the at least one positioning terminal.

Optionally, the receiving unit 17A is further configured to receive a quality factor of the position information of the at least one positioning terminal. In this case, the positioning unit 17B is further configured to position the to-be-positioned terminal 17 according to position information that is in the position information of the at least one positioning terminal and whose quality factor meets a preset condition.

In terms of hardware implementation, the receiving unit 17A may be referred to as a transceiver (or a transceiver machine, a transceiver antenna, or the like). The positioning unit 17B may be built in or independent of a processor of the to-be-positioned terminal 17 in a hardware form, or may be stored in a memory of the to-be-positioned terminal 17 in a software form such that the processor invokes and performs operations corresponding to the foregoing modules.

Figure 18:
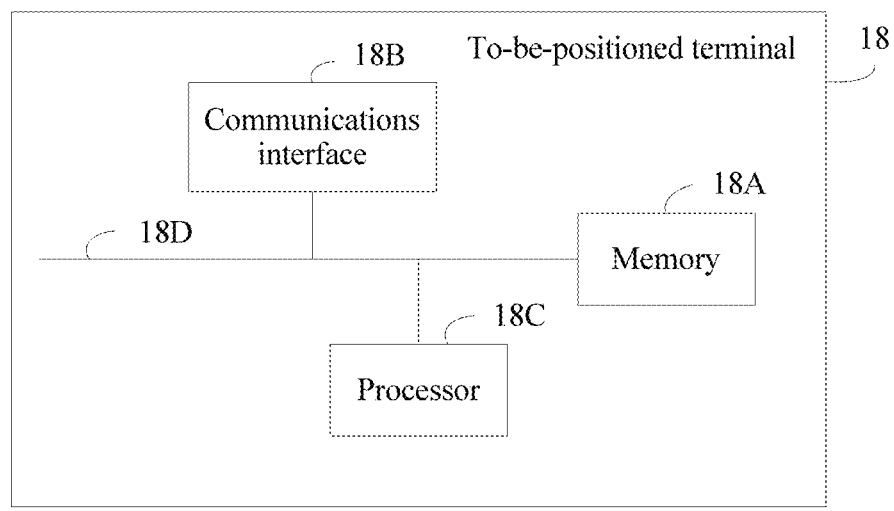
FIG. 18 is a schematic structural diagram of another to-be-positioned terminal according to an embodiment of the present disclosure.

As shown in FIG. 18, FIG. 18 is a schematic structural diagram of a to-be-positioned terminal 18 according to an embodiment of the present disclosure. The to-be-positioned terminal 18 shown in FIG. 18 is configured to perform an action performed by the to-be-positioned terminal in FIG. 14. For description of related content in this embodiment, refer to the foregoing description. Details are not described herein again. The to-be-positioned terminal 18 may include a memory 18A, a communications interface 18B, a processor 18C, and a system bus 18D. The memory 18A, the communications interface 18B and the processor 18C are connected using the system bus 18D.

The memory 18A is configured to store a computer executable instruction. When the to-be-positioned terminal 18 runs, the processor 18C executes the computer executable instruction stored in the memory 18A such that the to-be-positioned terminal 18 performs the action of the to-be-positioned terminal in any embodiment described above. Further, for the action performed by the to-be-positioned terminal, refer to the foregoing related description. Details are not described herein again.

This embodiment further provides a storage medium, and the storage medium may include the memory 18A.

In a specific implementation process, steps performed by the to-be-positioned terminal in FIG. 14 may be implemented in a manner in which the processor 18C in a hardware form executes the computer executable instruction in a software form that is stored in the memory 18A. To avoid repetition, details are not described herein again.

For beneficial effects that can be achieved by the to-be-positioned terminal 17 and the to-be-positioned terminal 18 in the embodiments, refer to the beneficial effects that can be achieved by the system shown in FIG. 13. Details are not described herein again.

It should be noted that specific examples of the memory, the processor, the communications interface, the system bus, and the like described above are as follows.

The memory may include a volatile memory such as a random-access memory (RAM), may include a non-volatile memory such as a read-only memory (ROM), a flash memory, a hard disk drive (HDD), or a solid-state drive (SSD), or may include a combination of the foregoing types of memories.

The processor may be a processor, or may be a general term of multiple processing elements. For example, the processor may be a central processing unit (CPU), or may be another general purpose processor, a digital signal processor (DSP), an application-specific integrated circuit (ASIC), a field-programmable gate array (FPGA) or another programmable logic device, a discrete gate or a transistor logic device, a discrete hardware component, or the like. The general purpose processor may be a microprocessor. Alternatively, the processor may be any conventional processor or the like, or may be a dedicated processor. The dedicated processor may include at least one of a baseband processing chip, a radio frequency processing chip, or the like. Further, the dedicated processor may further include a chip with another dedicated processing function in a device in which the processor is located.

The communications interface may be further a transceiver. The transceiver may be a wireless transceiver. For example, the wireless transceiver may be an antenna or the like.

The processor communicates with another device using the communications interface. The system bus provided above may include a data bus, a power bus, a control bus, a signal status bus, and the like. In this embodiment, for clarity of description, various buses are marked as the system bus.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

Finally, it should be noted that the foregoing embodiments are merely intended for describing the technical solutions of the present disclosure but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A positioning method for positioning a to-be-positioned terminal, comprising:

sending, by the to-be-positioned terminal, an instruction message to at least one positioning terminal according to a positioning request, wherein the at least one positioning terminal has an unknown position, wherein a distance between the at least one positioning terminal and the to-be-positioned terminal falls within a preset range, and wherein the instruction message instructs the at least one positioning terminal to execute a positioning packet interaction procedure with at least one first anchor in a preset anchor set so as to obtain first positioning support information;

receiving, by the to-be-positioned terminal, the first positioning support information from the at least one positioning terminal, wherein the first positioning support information comprises a travel time, a travel distance, a travel time difference or a travel distance difference of a signal between each positioning terminal of the at least one positioning terminal and each anchor of the at least one first anchor;

executing, by the to-be-positioned terminal, a positioning packet interaction procedure with at least one second anchor in the preset anchor set to obtain second positioning support information, wherein the second positioning support information comprises the travel time, the travel distance, the travel time difference or the travel distance difference of the signal between the to-be-positioned terminal and each anchor of the at least one second anchor; and calculating, by the to-be-positioned terminal, a location of the to-be-positioned terminal according to the first positioning support information, the second positioning support information, a location of the at least one first anchor and a location of the at least one second anchor.

2. The positioning method of claim 1, further comprising obtaining, by the to-be-positioned terminal, a quality factor of the first positioning support information, wherein the quality factor represents quality of the first positioning support information.

3. The positioning method of claim 2, wherein calculating, by the to-be-positioned terminal, the location of the to-be-positioned terminal according to the first positioning support information, the second positioning support information, the location of the at least one first anchor, and the location of the at least one second anchor comprises:

selecting, by the to-be-positioned terminal, target positioning support information from the first positioning support information according to the quality factor; and calculating, by the to-be-positioned terminal, the location of the to-be-positioned terminal according to the target positioning support information, the second positioning support information, the location of the at least one first anchor, and the location of the at least one second anchor.

4. The positioning method of claim 2, wherein obtaining, by the to-be-positioned terminal, the quality factor of the first positioning support information comprises obtaining the quality factor of the first positioning support information according to whether a transmission channel of a positioning packet in the positioning packet interaction procedure is on a line of sight (LOS) channel.

5. The positioning method of claim 2, wherein obtaining, by the to-be-positioned terminal, the quality factor of the first positioning support information comprises obtaining the quality factor of the first positioning support information according to a stability of the first positioning support information obtained for multiple times within a preset time period.

6. The positioning method of claim 2, wherein obtaining, by the to-be-positioned terminal, the quality factor of the first positioning support information comprises obtaining the quality factor of the first positioning support information according to a signal-to-noise ratio of a positioning packet in the positioning packet interaction procedure.

7. The positioning method of claim 2, wherein obtaining, by the to-be-positioned terminal, the quality factor of the first positioning support information comprises obtaining the quality factor of the first positioning support information according to a wireless signal bandwidth used in the positioning packet interaction procedure.

8. The positioning method of claim 2, wherein obtaining, by the to-be-positioned terminal, the quality factor of the first positioning support information comprises obtaining the quality factor of the first positioning support information according to an analog to digital converter (ADC) sampling rate of a receiver that is used in the positioning packet interaction procedure.

9. A positioning device for positioning a to-be-positioned terminal, comprising:
a transmitter configured to send an instruction message to at least one positioning terminal according to a positioning request, wherein the at least one positioning terminal has an unknown position, wherein a distance between the at least one positioning terminal and the to-be-positioned terminal falls within a preset range, and wherein the instruction message instructs the at least one positioning terminal to execute a positioning packet interaction procedure with at least one first anchor in a preset anchor set so as to obtain first positioning support information;
a receiver coupled to the transmitter and configured to receive the first positioning support information from the at least one positioning terminal, wherein the first positioning support information comprises a travel time, a travel distance, a travel time difference or a travel distance difference of a signal between each positioning terminal of the at least one positioning terminal and each anchor of the at least one first anchor;
a processor coupled to the receiver and the transmitter, wherein the processor is configured to:
execute a positioning packet interaction procedure with at least one second anchor in the preset anchor set to obtain second positioning support information, wherein the second positioning support information comprises the travel time, the travel distance, the travel time difference or the travel distance difference of the signal between the to-be-positioned terminal and each anchor of the at least one second anchor; and
calculate location of the to-be-positioned terminal according to the first positioning support information, the second positioning support information, a location of the at least one first anchor, and a location of the at least one second anchor.

10. The positioning device of claim 9, wherein the processor is further configured to obtain quality factor of the first positioning support information, wherein the quality factor represents a quality of the first positioning support information.

11. The positioning device of claim 10, wherein the processor is further configured to:
select target positioning support information from the first positioning support information according to the quality factor; and
calculate the location of the to-be-positioned terminal according to the target positioning support information, the second positioning support information, the location of the at least one first anchor, and the location of the at least one second anchor.

12. The positioning device of claim 10, wherein the processor is further configured to obtain the quality factor of the first positioning support information according to whether a transmission channel of a positioning packet in the positioning packet interaction procedure is on a line of sight (LOS) channel.

13. The positioning device of claim 10, wherein the processor is further configured to obtain the quality factor of the first positioning support information according to a signal-to-noise ratio of a positioning packet in the positioning packet interaction procedure.

14. The positioning device of claim 10, wherein the processor is further configured to obtain the quality factor of the first positioning support information according to a wireless signal bandwidth used in the positioning packet interaction procedure.

15. The positioning device of claim 10, wherein the processor is further configured to obtain the quality factor of the first positioning support information according to an analog to digital converter (ADC) sampling rate of the receiver that is used in the positioning packet interaction procedure.

16. The positioning device of claim 10, wherein the processor is further configured to obtain the quality factor of the first positioning support information according to a stability of the first positioning support information obtained for multiple times within a preset time period.

17. A computer program product comprising computer-executable instructions stored on a non-transitory computer-readable medium that, when executed by a processor, cause a to-be-positioned terminal to:
send an instruction message to at least one positioning terminal according to a positioning request, wherein the at least one positioning terminal has an unknown position, wherein a distance between the at least one positioning terminal and the to-be-positioned terminal falls within a preset range, and wherein the instruction message instructs the at least one positioning terminal to execute a positioning packet interaction procedure with at least one first anchor in a preset anchor set so as to obtain first positioning support information;
receive the first positioning support information from the at least one positioning terminal, wherein the first positioning support information comprises a travel time, a travel distance, a travel time difference or a travel distance difference of a signal between each positioning terminal of the at least one positioning terminal and each anchor of the at least one first anchor;
execute a positioning packet interaction procedure with at least one second anchor in the preset anchor set to obtain second positioning support information, wherein the second positioning support information comprises the travel time, the travel distance, the travel time difference or the travel distance difference of the signal between the to-be-positioned terminal and each anchor of the at least one second anchor; and
calculate a location of the to-be-positioned terminal according to the first positioning support information, the second positioning support information, a location of the at least one first anchor and a location of the at least one second anchor.

18. The computer program product of claim 17, wherein the computer program product further causes the to-be-positioned terminal to obtain a quality factor of the first positioning support information, wherein the quality factor represents quality of the first positioning support information.

19. The computer program product of claim 18, wherein the computer program product further causes the to-be-positioned terminal to:
- select target positioning support information from the first positioning support information according to the quality factor; and
- calculate the location of the to-be-positioned terminal according to the target positioning support information, the second positioning support information, the location of the at least one first anchor, and the location of the at least one second anchor.

20. The computer program product of claim 18, wherein the computer program product further causes the to-be-positioned terminal to obtain the quality factor of the first positioning support information according to:
- a transmission channel of a positioning packet in the positioning packet interaction procedure being on a line of sight (LOS) channel;
- a stability of the first positioning support information obtained for multiple times within a preset time period;
- a signal-to-noise ratio of a positioning packet in the positioning packet interaction procedure;
- a wireless signal bandwidth used in the positioning packet interaction procedure; or
- an analog to digital converter (ADC) sampling rate of a receiver that is used in the positioning packet interaction procedure.

\* \* \* \* \*